United States Patent
Jiang et al.

(10) Patent No.: US 10,651,670 B1
(45) Date of Patent: May 12, 2020

(54) ELECTRONIC DEVICES WITH WIRELESS CHARGING ANTENNA ARRAYS

(71) Applicant: Apple Inc., Cupertino, CA (US)

(72) Inventors: Bing Jiang, Fremont, CA (US);
Indranil S. Sen, Santa Clara, CA (US);
Mohit Narang, Cupertino, CA (US);
Mun Soo Bae, San Jose, CA (US)

(73) Assignee: Apple Inc., Cupertino, CA (US)

( * ) Notice: Subject to any disclaimer, the term of this patent is extended or adjusted under 35 U.S.C. 154(b) by 335 days.

(21) Appl. No.: 15/491,899

(22) Filed: Apr. 19, 2017

Related U.S. Application Data

(63) Continuation of application No. 15/426,954, filed on Feb. 7, 2017, now abandoned.

(60) Provisional application No. 62/297,538, filed on Feb. 19, 2016.

(51) Int. Cl.
| | |
|---|---|
| *H02J 7/02* | (2016.01) |
| *H02J 50/40* | (2016.01) |
| *H02J 50/80* | (2016.01) |
| *H02J 50/23* | (2016.01) |
| *H02J 50/12* | (2016.01) |
| *H04B 5/00* | (2006.01) |

(52) U.S. Cl.
CPC ............ *H02J 7/025* (2013.01); *H02J 50/12* (2016.02); *H02J 50/23* (2016.02); *H02J 50/40* (2016.02); *H02J 50/80* (2016.02); *H04B 5/0037* (2013.01); *H04B 5/0075* (2013.01)

(58) Field of Classification Search
CPC .................................. H02J 7/025; H02J 50/12
USPC ......................................................... 320/108
See application file for complete search history.

(56) References Cited

U.S. PATENT DOCUMENTS

| | | | |
|---|---|---|---|
| 6,127,799 A | 10/2000 | Krishana | |
| 8,035,255 B2 | 10/2011 | Kurs et al. | |
| 8,097,983 B2 | 1/2012 | Karalis et al. | |
| 8,947,379 B2 | 2/2015 | Bakken et al. | |
| 9,054,406 B2 | 6/2015 | Ueda et al. | |
| 9,124,141 B2 | 9/2015 | Amma et al. | |
| 9,143,000 B2 * | 9/2015 | Leabman | H02J 7/0042 |
| 9,166,438 B2 | 10/2015 | Sultenfuss et al. | |

(Continued)

FOREIGN PATENT DOCUMENTS

| | | |
|---|---|---|
| KR | 10-2014-0066068 | 5/2014 |
| WO | 2015009329 | 1/2015 |
| WO | 2015022690 | 2/2015 |

*Primary Examiner* — Richard V Muralidar
(74) *Attorney, Agent, or Firm* — Treyz Law Group, P.C.; Michael H. Lyons

(57) ABSTRACT

An electronic device may transfer power wirelessly to an external device. The electronic device may include a housing having a cavity. A cover layer may be formed over the cavity. An array of antennas may be formed within the cavity. Antennas in the array may transfer wireless charging signals to the external device through the cover layer to charge the external device while the external device is in contact with the cover layer. Impedance detection circuitry may gather impedance matching information from each antenna in the array. Control circuitry may select an antenna having a best impedance match with the external device for transmitting the wireless charging signals. One or more antennas in the array may form a block filter for the selected antenna. Multiple near-field coupled antennas in the array may be selected for transmitting the charging signals to focus the charging signals on the external device.

19 Claims, 19 Drawing Sheets

(56) References Cited

U.S. PATENT DOCUMENTS

| | | |
|---|---|---|
| 9,424,048 B2 | 8/2016 | Jakoboski et al. |
| 2010/0259217 A1 | 10/2010 | Baarman et al. |
| 2011/0260681 A1 | 10/2011 | Guccione et al. |
| 2012/0139484 A1 | 6/2012 | Gunderman et al. |
| 2013/0342025 A1 | 12/2013 | Cook et al. |
| 2015/0002086 A1 | 1/2015 | Matos et al. |
| 2015/0171658 A1 | 6/2015 | Manova-Elssibony et al. |
| 2015/0277592 A1 | 10/2015 | Nishigaki |
| 2017/0237469 A1* | 8/2017 | Taghivand .............. H02J 50/20 455/41.1 |
| 2018/0241255 A1* | 8/2018 | Leabman ................ H02J 50/40 |
| 2019/0181691 A1* | 6/2019 | Wight .................... H02J 50/23 |

* cited by examiner

ELECTRONIC DEVICES WITH WIRELESS CHARGING ANTENNA ARRAYS

CROSS-REFERENCE TO RELATED APPLICATION

This application is a continuation of patent application Ser. No. 15/426,954, filed on Feb. 7, 2017, which claims the benefit of provisional patent application No. 62/297,538, filed Feb. 19, 2016, both of which are hereby incorporated by reference herein in their entireties. This application claims the benefit of and claims priority to patent application Ser. No. 15/426,954, filed on Feb. 7, 2017 and provisional patent application No. 62/297,538 filed on Feb. 19, 2016.

BACKGROUND

This relates generally to electronic devices and, more particularly, to electronic devices with wireless circuitry.

Electronic devices often include circuitry for performing wireless communications. For example, cellular telephones, computers, and other devices often contain antennas and wireless transceivers for supporting wireless communications. Some devices include circuitry to support wireless charging operations.

SUMMARY

Challenges can arise in implementing wireless charging and communications systems. If care is not taken, sensitivity to antenna misalignment and other issues can make it difficult or impossible to achieve desired levels of performance when integrating antennas and other structures into devices of interest.

It would therefore be desirable to be able to provide systems with improved wireless circuitry.

An electronic device may be provided with wireless circuitry. The electronic device may use the wireless circuitry to transfer power wirelessly to an external device or to communicate wirelessly with external device. The electronic device may include housing structures. A cavity may be formed in the housing structures. A dielectric cover layer may be formed over the cavity. An array of antennas may be formed within the cavity. One or more of the antennas in the array may transfer wireless charging signals to the external device through the dielectric cover layer to charge the external device. The antennas may wirelessly charge the external device while the external device is in contact with the dielectric cover layer.

The electronic device may include impedance detection circuitry coupled to the antennas. The impedance detection circuitry may detect when the cover layer is in contact with the external device. For example, the impedance detection circuitry may gather impedance matching information from each antenna in the array. The impedance detection circuitry may include power measurement circuitry that measures a power level of the transmitted wireless charging signals. The power measurement circuitry may measure a power level of a reflected version of the transmitted wireless charging signals. Control circuitry in the device may identify the impedance matching information by comparing the measured power levels. The impedance matching information may identify which antennas are to be used for transmitting the wireless charging signals. For example, the control circuitry may select an antenna in the array having a best impedance match with the external device for transmitting the wireless charging signals. If desired, the impedance matching information may identify an optimal frequency with which the selected antenna is to transmit the wireless charging signals.

The array of antennas may include antenna structures such as one or more patch antennas. The patch antenna may have first and second feeding points for transmitting the wireless charging signals using first and second different polarities. Antennas in the array that are located around the antenna that transmits the wireless charging signals may be disabled from transmitting the wireless charging signals. The disabled antennas may form a block filter for the selected antenna. If desired, multiple adjacent antennas in the array may be selected for transmitting the wireless charging signals. Each of the adjacent antennas may be electromagnetically near-field coupled to focus the wireless charging signals on the external device.

DETAILED DESCRIPTION

Figure 1:
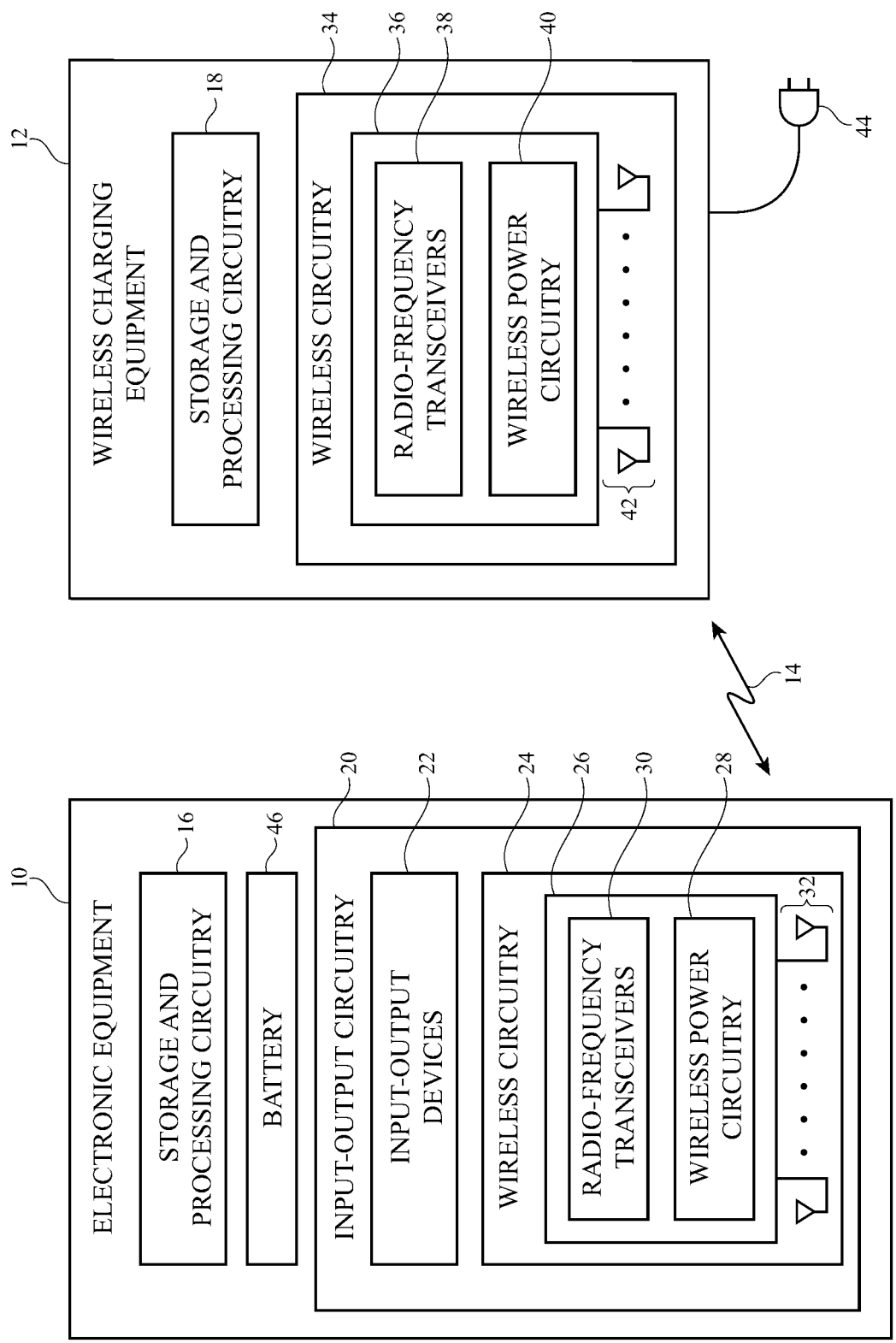
FIG. 1 is a schematic diagram of an electronic device and wireless charging equipment in accordance with an embodiment.

A system of the type that may support wireless charging and wireless communications is shown in exemplary FIG. 1. As shown in FIG. 1, the system may include electronic devices such as electronic devices 10 and 12. Devices such as 10 and 12 may communicate wirelessly over a wireless communications link. The wireless communications link may be a cellular telephone link (e.g., a wireless link at frequencies of 700 MHz to 2700 MHz or other suitable cellular telephone frequencies), may be a wireless local area network link operating at 2.4 GHz, 5 GHz, or other suitable wireless local area network frequencies, may involve millimeter wave communications (e.g., communications of the type sometimes referred to as extremely high frequency (EHF) communications that involve signals at 60 GHz or other frequencies between about 10 GHz and 400 GHz), may involve WiGig communications (millimeter wave IEEE 802.11 ad communications in a communications band at 60 GHz), or may involve communications at any other wireless communications frequencies in any other desired communications band (e.g., at frequencies above 700 MHz, frequencies below 700 MHz, frequencies above 400 GHz, frequencies below 400 GHz, frequencies from 1-1000 MHz, frequencies above 100 MHz, frequencies above 500 MHz, frequencies above 1 GHz, frequencies from 1-400 GHz, frequencies below 100 GHz, in a 243 GHz frequency band, a 2.45 GHz frequency band, a 5.75 GHz frequency band, other frequency bands such as Industrial Scientific and Medical (ISM) bands, unlicensed frequency bands, or at any other frequencies of interest).

Power may also be transferred wirelessly between devices 12 and 10 at these frequencies or any other suitable frequencies. For example, device 12 may transfer power wirelessly to device 10 (e.g., to power device 10 and/or to charge a battery in device 10). Wireless communications and wireless power transfer operations may be supported using wireless paths such as wireless path 14 of FIG. 1. Device 12 may sometimes be referred to as wireless charging equipment 12, wireless charging device 12, or charging device 12, because device 12 performs wireless charging for device 10.

Device 10 may be, for example, a mobile telephone device, tablet computer device, laptop computer device, or any other desired electronic device. Wireless charging device 12 may be a peripheral or docking device. In one suitable arrangement, wireless charging device 12 is a mat-shaped device or other relatively flat structure (sometimes referred to herein as a wireless charging mat). If desired, charging device 12 may be, for example, a mobile telephone device, tablet computer device, laptop computer device, or any other desired electronic device. Device 10 may be docked or otherwise placed onto or into contact with device 12 for performing wireless charging. The example of FIG. 1 is illustrative. In general, devices 10 and 12 may be any desired electronic devices. For example, it is possible for device 12 to be a desktop computer that wireless charges a watch.

As shown in FIG. 1, device 10 may include control circuitry such as storage and processing circuitry 16. Device 12 may include control circuitry such as storage and processing circuitry 18. Storage and processing circuitry 16 and 18 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 16 may be used to control the operation of device 10 whereas processing circuitry in storage and processing circuitry 18 is used to control the operation of device 12. This processing circuitry may be based on one or more microprocessors, microcontrollers, digital signal processors, baseband processor integrated circuits, application specific integrated circuits, etc.

Storage and processing circuitry 16 may be used to run software on device 10 and/or storage and processing circuitry 18 may be used to run software on device 12 such as internet browsing applications, voice-over-internet-protocol (VOIP) telephone call applications, email applications, media playback applications, operating system functions, functions related to supporting wireless charging operations, etc. To support interactions with external equipment, storage and processing circuitry 16 and 18 may be used in implementing communications protocols. Communications protocols that may be implemented using storage and processing circuitry 16 and 18 include internet protocols, wireless local area network protocols (e.g., IEEE 802.11 protocols—sometimes referred to as WiFi® and WiGig), protocols for other short-range wireless communications links such as the Bluetooth® protocol, cellular telephone protocols, MIMO protocols, antenna diversity protocols, satellite navigation system protocols, etc.

Device 10 may include input-output circuitry 20. Input-output circuitry 20 may include input-output devices 22. Input-output devices 22 may be used to allow data to be supplied to device 10 and to allow data to be provided from device 10 to external devices such as device 12. Input-output devices 22 may include user interface devices, data port devices, and other input-output components. For example, input-output devices may include touch screens (i.e., displays with touch sensors), displays without touch sensor capabilities, buttons, joysticks, scrolling wheels, touch pads, key pads, keyboards, microphones, cameras, speakers, status indicators, light sources, audio jacks and other audio port components, digital data port devices, light sensors, accelerometers or other components that can detect motion and device orientation relative to the Earth, capacitance sensors, proximity sensors (e.g., a capacitive proximity sensor and/or an infrared proximity sensor), magnetic sensors, a connector port sensor or other sensor that determines whether a device is mounted in a dock, and other sensors and input-output components.

Input-output circuitry 20 may include wireless circuitry 24. Wireless circuitry 24 may include wireless circuitry 26 (sometimes referred to as transmitter circuitry, receiver circuitry, transceiver circuitry, etc.) for supporting wireless charging (e.g., using wireless power circuitry 28) and/or wireless communications (e.g., using wireless communications circuitry 30). Wireless circuitry 26 may be formed from one or more integrated circuits, may include power amplifier circuitry, low-noise input amplifiers, passive RF components, and/or other circuitry. Circuitry 26 may transmit and/or receive wireless signals over path 14 using one or more antennas 32.

Device 12 may include wireless circuitry 34. Wireless circuitry 34 may include wireless circuitry 36 (sometimes referred to as transmitter circuitry, receiver circuitry, transceiver circuitry etc.) for supporting wireless charging (e.g., using wireless power circuitry 40) and/or wireless communications (e.g., using wireless communications circuitry 38). Wireless circuitry 34 may be formed from one or more integrated circuits, may include power amplifier circuitry, low-noise input amplifiers, passive RF components, and/or other circuitry. Circuitry 36 may transmit and/or receive wireless signals over path 14 using one or more antennas 42. If desired, device 12 may include input-output devices such as input-output devices similar to devices 22 on electronic device 10.

Wireless communications circuitry 30 on device 10 and/or wireless communications circuitry 38 on device 12 may include wireless local area network transceiver circuitry that may handle 2.4 GHz and 5 GHz bands for WiFi® (IEEE 802.11) communications and that may handle the 2.4 GHz Bluetooth® communications band. Circuitry 30 and/or circuitry 38 may also include cellular telephone transceiver circuitry for handling wireless communications in frequency ranges such as a low communications band from 700 to 960 MHz, a midband from 1710 to 2170 MHz, and a high band from 2300 to 2700 MHz or other communications bands between 700 MHz and 2700 MHz or other suitable frequencies (as examples). Circuitry 30 and/or circuitry 38 may handle voice data and non-voice data. Circuitry 30 and/or circuitry 38 may include millimeter wave transceiver circuitry that may support communications at extremely high frequencies (e.g., millimeter wave frequencies from 10 GHz to 400 GHz or other millimeter wave frequencies). Circuitry 30 and/or circuitry 38 may handle IEEE 802.11 ad (WiGig) communications at 60 GHz (millimeter wave frequencies). If desired, circuitry 30 and/or 38 may include satellite navigation system circuitry such as Global Positioning System (GPS) receiver circuitry for receiving GPS signals at 1575 MHz or for handling other satellite positioning data (e.g., GLONASS signals at 1609 MHz). Satellite navigation system signals may be received from a constellation of satellites orbiting the earth.

In satellite navigation system links, cellular telephone links, and other long-range links, wireless signals are typically used to convey data over thousands of feet or miles. In WiFi® and Bluetooth® links and other short-range wireless links, wireless signals are typically used to convey data over tens or hundreds of feet. Extremely high frequency (EHF) wireless transceiver circuitry (e.g., WiGig circuitry) may convey signals over these or these short distances that travel between transmitter and receiver over a line-of-sight path. If desired, antenna diversity schemes may be used to ensure that the antennas that have become blocked or that are otherwise degraded due to the operating environment of devices 10 and 12 can be switched out of use and higher-performing antennas used in their place.

Wireless circuitry 24 and 34 can include circuitry for other wireless operations if desired. For example, wireless communications circuitry 30 and circuitry 38 may include circuitry for receiving television and radio signals, paging system transceivers, near field communications (NFC) circuitry, etc.

Transmission line paths may be used to route antenna signals within devices 10 and 12. For example, transmission line paths may be used to couple antenna structures 32 to circuitry 26. Similarly, transmission line paths may be used to couple antenna structures 42 to circuitry 36. Transmission lines in devices 10 and 12 may include coaxial cable paths, microstrip transmission lines, stripline transmission lines, edge-coupled microstrip transmission lines, edge-coupled stripline transmission lines, transmission lines formed from combinations of transmission lines of these types, etc. Filter circuitry, switching circuitry, impedance matching circuitry, and other circuitry may be interposed within the transmission lines, if desired.

Device 10 may contain multiple antennas 32 and device 12 may include multiple antennas 42. The antennas may be used together or one of the antennas may be switched into use while other antenna(s) are switched out of use. If desired, control circuitry 16 may be used to select an optimum antenna to use in device 10 in real time and/or to select optimum settings for wireless circuitry 24. Antenna adjustments may be made to tune antennas 32 to perform in desired frequency ranges and to otherwise optimize antenna performance. Sensors may be incorporated into antennas 32 to gather sensor data in real time that is used in adjusting antennas 32. If desired, control circuitry 18 may be used to select an optimum antenna to use in device 12 in real time and/or to select optimum settings for wireless circuitry 34. Antenna adjustments may be made to tune antennas 42 to perform in desired frequency ranges and to otherwise optimize antenna performance. Sensors may be incorporated into antennas 42 to gather sensor data in real time that is used in adjusting antennas 42.

Antennas 32 and 42 may be formed using any suitable antenna type. For example, antennas 32 and 42 may include antennas with resonating elements that are formed from loop antenna structures, patch antenna structures, inverted-F antenna structures, slot antenna structures, planar inverted-F antenna structures, helical antenna structures, hybrids of these designs, etc. Multiple different antenna types may be used in implementing antennas 32 on device 10 and multiple different antenna types may be used in implementing antennas 42 on device 12, if desired.

Wireless charging equipment 12 may receive power from a corresponding power source. Power sources that provide power to wireless charging equipment include other wireless charging devices, wired inputs such as an alternating-current (AC) powering input or a direct current (DC) powering input, solar power inputs, or any other desired power source. In the example of FIG. 1, wireless charging equipment 12 receives power over power plug 44. Plug 44 may mate with a wall socket or other power supply equipment for powering device 12. Device 12 may include AC/DC conversion circuitry or any other desired circuitry to convert power received over plug 44 into wireless power for transmission to device 10. If desired, wireless communications circuitry 12 may include battery circuitry (not shown).

During wireless power transfer operations, wireless power transfer circuitry in circuit 40 of charging device 12 and circuit 28 of charged device 10 may be used to transfer power between the devices. Circuitry 40 and 28 may sometimes be referred to herein as wireless charging circuitry because circuitry 40 and 28 handles transmission and reception of wireless power associated with charging battery 46 on device 10. For example, charging device 12 may use circuitry 40 and antennas 42 to transfer power wirelessly over path 14. Device 10 may use antennas 32 and circuitry 28 to receive the transmitted wireless power. Circuitry 28 in charged device 10 may include power receiver circuitry that converts received wireless power into a form that is suitable for powering the components of device 10. For example, circuitry 28 may include power rectifier circuitry or other conversion circuitry (e.g., AC/DC converter circuitry, DC/DC converter circuitry, etc.) that converts received wireless charging signals 14 into voltages that can be used to power the components of device 10 and/or to charge battery 46 (e.g., circuitry 28 may convert AC wireless charging signals received over antennas 32 into DC power to supply power rails to the components of device 10 and/or to charge battery 46).

Any desirable frequencies may be used for wireless charging (e.g., frequencies in the kHz range, the MHz range, or in the GHz range, frequencies of 1 kHz to 1 MHz, frequencies of 1 MHz to 100 MHz, frequencies in the 100 MHz-400 GHz range, etc.). Wireless power may be transmitted over path 14 according to any desired wireless powering protocol. Wireless power may be transmitted over path 14 in the form of radio-frequency signals, near field coupling (NFC) signals, magnetic resonance signals, or any other desired wireless signals that are capable of conveying power from charger device 12 to receiving device 10 over the air (e.g., without a direct electrical connection between devices 10 and 12).

Antenna diversity schemes may be implemented in which multiple redundant antennas are used in handling communications for a particular band or bands. In an antenna diversity scheme, storage and processing circuitry 16 on device 10 may select which antenna to use in real time based on signal strength measurements or other data. In multiple-input-multiple-output (MIMO) schemes, multiple antennas may be used to transmit and receive multiple data streams, thereby enhancing data throughput.

Figure 2:
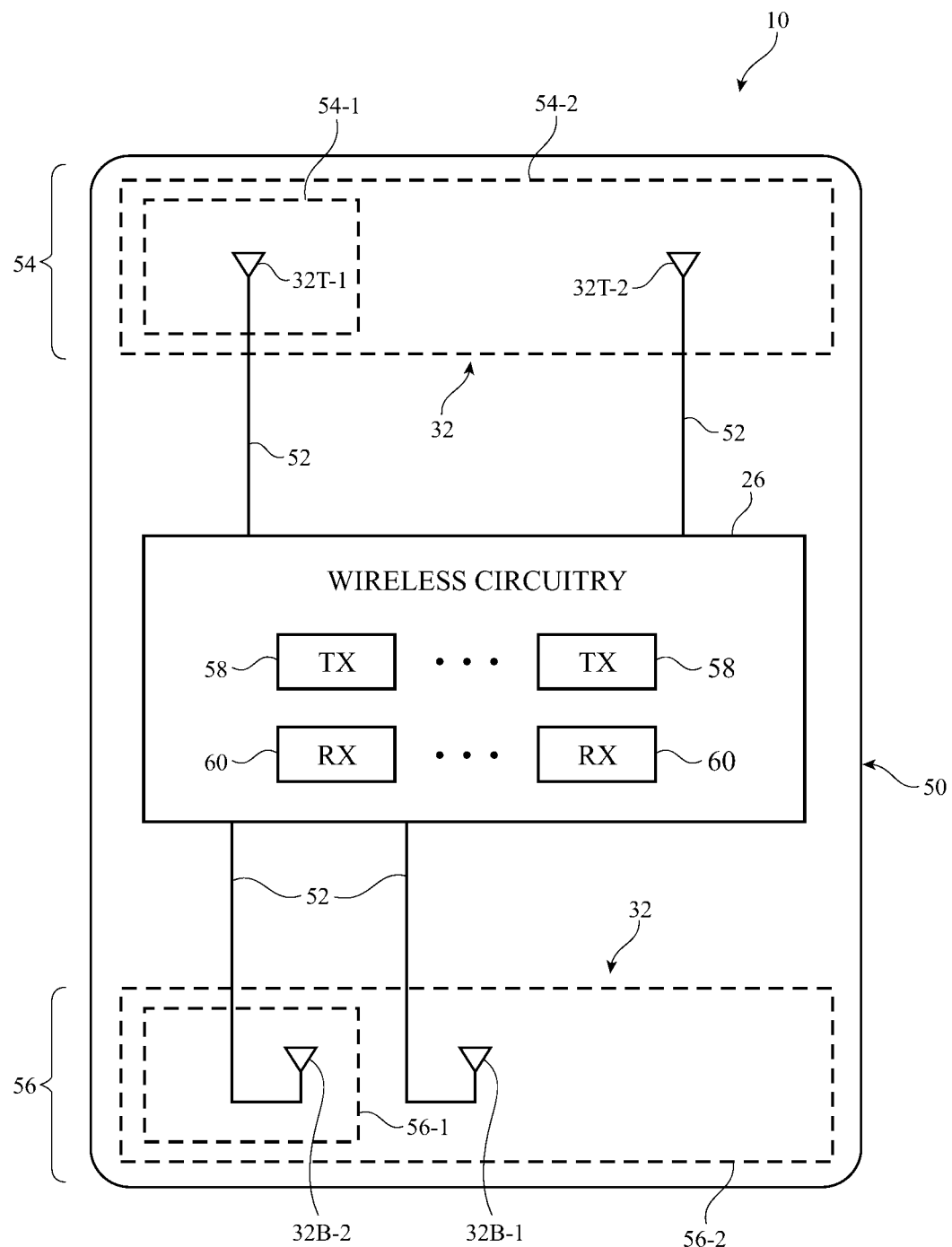
FIG. 2 is a schematic view of an illustrative electronic device having antennas for receiving wireless charging signals in accordance with an embodiment.

Illustrative locations in which antennas 32 may be formed in device 10 are shown in FIG. 2. As shown in FIG. 2, electronic device 10 may have a housing such as housing 50. Housing 50 may include plastic walls, metal housing structures, structures formed from carbon-fiber materials or other composites, glass, ceramics, or other suitable materials. Housing 50 may be formed using a single piece of material (e.g., using a unibody configuration) or may be formed from a frame, housing walls, and other individual parts that are assembled to form a completed housing structure. The components of device 10 that are shown in FIG. 1 may be mounted within housing 50. Antenna structures 32 may be mounted within housing 50 and may, if desired, be formed using parts of housing 50. For example, housing 50 may include metal housing sidewalls, peripheral conductive members such as band-shaped members (with or without dielectric gaps), conductive bezels, and other conductive structures that may be used in forming antenna structures 50. Portions of housing 50 such as metal housing sidewalls may form all or some of the ground plane structures and/or resonating element structures for one or more antennas 32. Housing 50 may include a planar rear metal surface (e.g., a surface forming a rear face of the device). The metal housing side walls may, for example, form external surfaces for device 10 that extend from the planar rear metal surface to a front face of device 10. A display may be formed at the front face of device 10 if desired.

As shown in FIG. 2, antenna structures 32 may be coupled to transceiver circuitry 26 by paths such as paths 52. Paths 52 may include transmission line structures such as coaxial cables, microstrip transmission lines, stripline transmission lines, etc. Paths 52 may also include impedance matching circuitry, filter circuitry, and switching circuitry. Impedance matching circuitry may be used to ensure that antennas 32 are efficiently coupled to transceiver circuitry 26 in communications bands of interest. Filter circuitry may be used to implement frequency-based multiplexing circuits such as diplexers, duplexers, or other multiplexing circuits. Switching circuitry may be used to selectively couple antennas 32 to desired ports of transceiver circuitry 26. For example, in one operating mode a switch may be configured to route one of paths 52 to a given antenna and in another operating mode the switch may be configured to route a different one of paths 52 to the given antenna. The use of switching and filtering circuitry between transceiver circuitry 26 and antennas 32 allows device 10 to support multiple communications bands of interest with a limited number of antennas.

In a device such as a cellular telephone that has an elongated rectangular outline, it may be desirable to place antennas 32 at one or both ends of the device. As shown in FIG. 2, for example, some of antennas 32 may be placed in upper end region 54 of housing 50 and some of antennas 32 may be placed in lower end region 56 of housing 50. The antenna structures in device 10 may include a single antenna in region 54, a single antenna in region 56, multiple antennas in region 54, multiple antennas in region 56, or may include one or more antennas located elsewhere in housing 50.

Antenna structures 32 may be formed within some or all of regions such as regions 54 and 56. For example, an antenna such as antenna 32T-1 may be located within region 54-1 or an antenna such as antenna 32T-2 may be formed that fills some or all of region 54-2. An antenna such as antenna 32B-1 may fill some or all of region 56-2 or an antenna such as antenna 32B-2 may be formed in region 56-1. These types of arrangements need not be mutually exclusive. For example, region 56 may contain a first antenna such as antenna 32B-1 and a second antenna such as antenna 32B-2.

Transceiver circuitry 26 may contain transmitters such as transmitters 58 and receivers such as receivers 60. Transmitters 58 and receivers 60 may be implemented using one or more integrated circuits (e.g., cellular telephone communications circuits, wireless local area network communications circuits, circuits for Bluetooth® communications, circuits for receiving satellite navigation system signals, power amplifier circuits for increasing transmitted signal power, low noise amplifier circuits for increasing signal power in received signals, other suitable wireless communications circuits, and combinations of these circuits). One or more receivers 60 may be used to receive wireless power from wireless charging device 12 (e.g., one or more receivers 60 may form part of wireless power circuitry 28 of FIG. 1). If desired, wireless power receivers 60 may receive wireless charging signals over the same antennas 32 that are used by radio-frequency transceivers 30 or may receive wireless charging signals over dedicated charging antennas that are not used by radio-frequency transceivers 30.

In one suitable arrangement, wireless charging device 12 may be a mat-shaped device or other relatively flat device. When it is desired to charge device 10, a user may place device 10 on top of wireless charging device 12. For example, a user may place device 10 onto a top surface of charging device 12 such that device 10 is in contact with the top surface of charging device 12. Wireless power may be conveyed from charging device 12 to electronic device 10 over wireless path 14 while device 10 is in mechanical (physical) contact with charging device 12. Even though device 10 is in physical contact with charging device 12 in this scenario, antennas 32 on device 10 may be separated from antennas 42 on charging device 12 such that wireless charging signals may be conveyed between the antennas.

Figure 3:
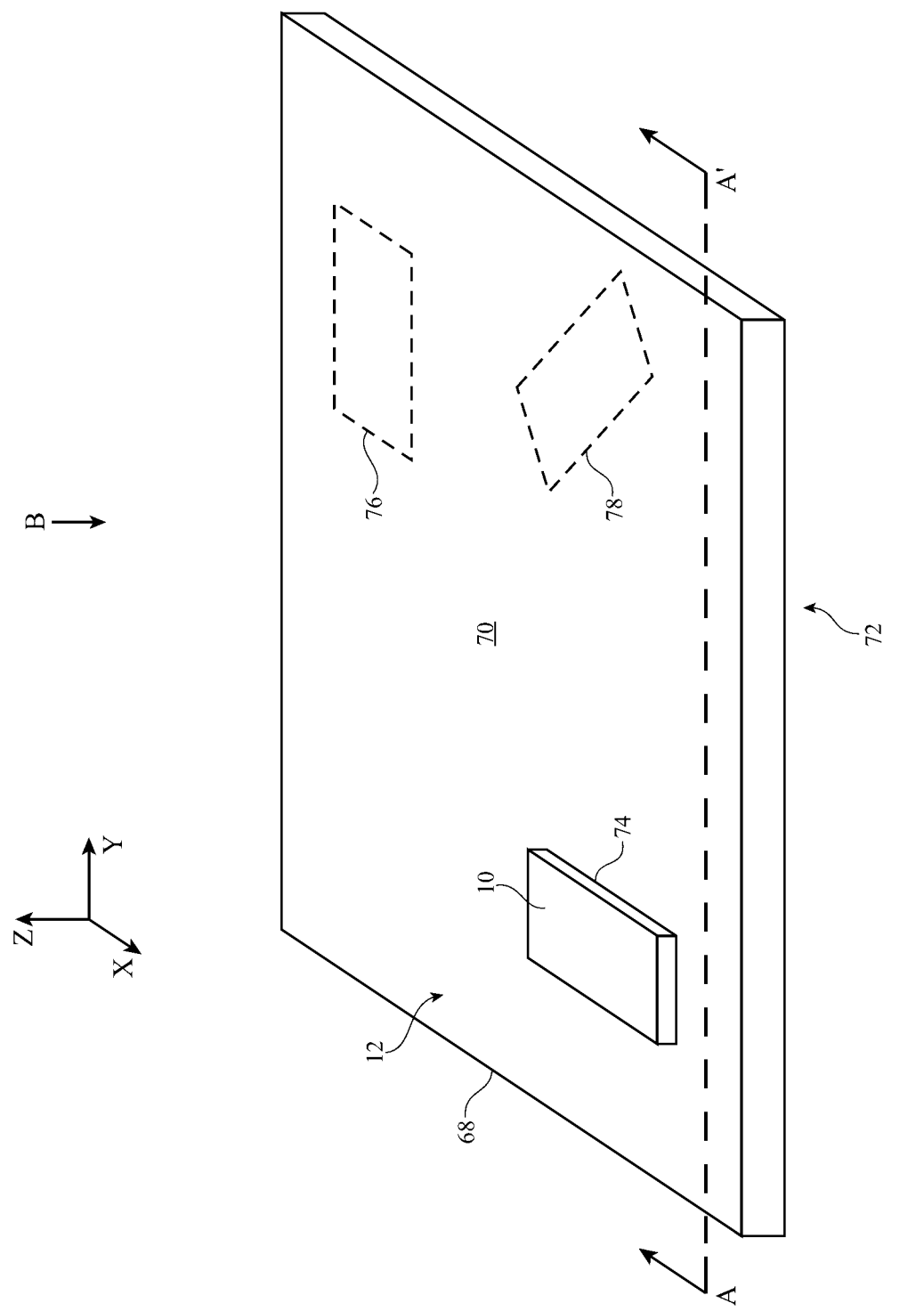
FIG. 3 is a perspective view showing how an electronic device may be placed on top of illustrative wireless charging equipment for wirelessly charging the device in accordance with an embodiment.

FIG. 3 is a perspective view showing how device 10 may be placed on a surface of device 12 for wirelessly charging device 10. Wireless charging device 12 may, for example, be a mat-shaped device. Charging device 12 may therefore sometimes be referred to herein as wireless charging mat 12 or wireless charging receptacle 12.

As shown in FIG. 3, wireless charging device 12 may have a housing 68. Housing 68 may include plastic walls, metal housing structures, structures formed from carbon-fiber materials or other composites, glass, ceramics, or other suitable materials. Housing 68 may be formed using a single piece of material (e.g., using a unibody configuration) or may be formed from a frame, housing walls, and other individual parts that are assembled to form a completed housing structure. Top surface 70 of housing 68 may extend across a length and width of charging device 12. Housing 68 may have a bottom surface 72 that opposes top surface 70. Sidewalls of housing 68 may extend from top surface 70 to bottom surface 72. The side walls of housing 68 may be shorter than the length and width of surface 70, for example. The example of FIG. 3 in which top surface 70 has a rectangular outline is merely illustrative. In general, surface 70 may have any desired outline (e.g., a polygonal outline, a square outline, a circular outline, an elliptical outline, etc.).

When a user desires to wirelessly charge device 10 using charging device 12, the user may place device 10 onto top surface 70 of device 12. In the example of FIG. 3, device 12 is placed at location 74 on top surface 70. Wireless charging device 12 may transmit wireless charging signals to device 10 while device 10 is placed on surface 70. For example, one or more antennas 42 within housing 68 may transmit wireless charging signals to device 10 through top surface 70. If desired, device 10 may be placed at other locations and at other orientations on surface 70. For example, device 10 may be placed at locations such as location 76 or location 78. Wireless charging device 12 may be configured to transmit wireless charging signals to device 10 regardless of the location and orientation at which device 10 is placed on surface 70.

Figure 4:
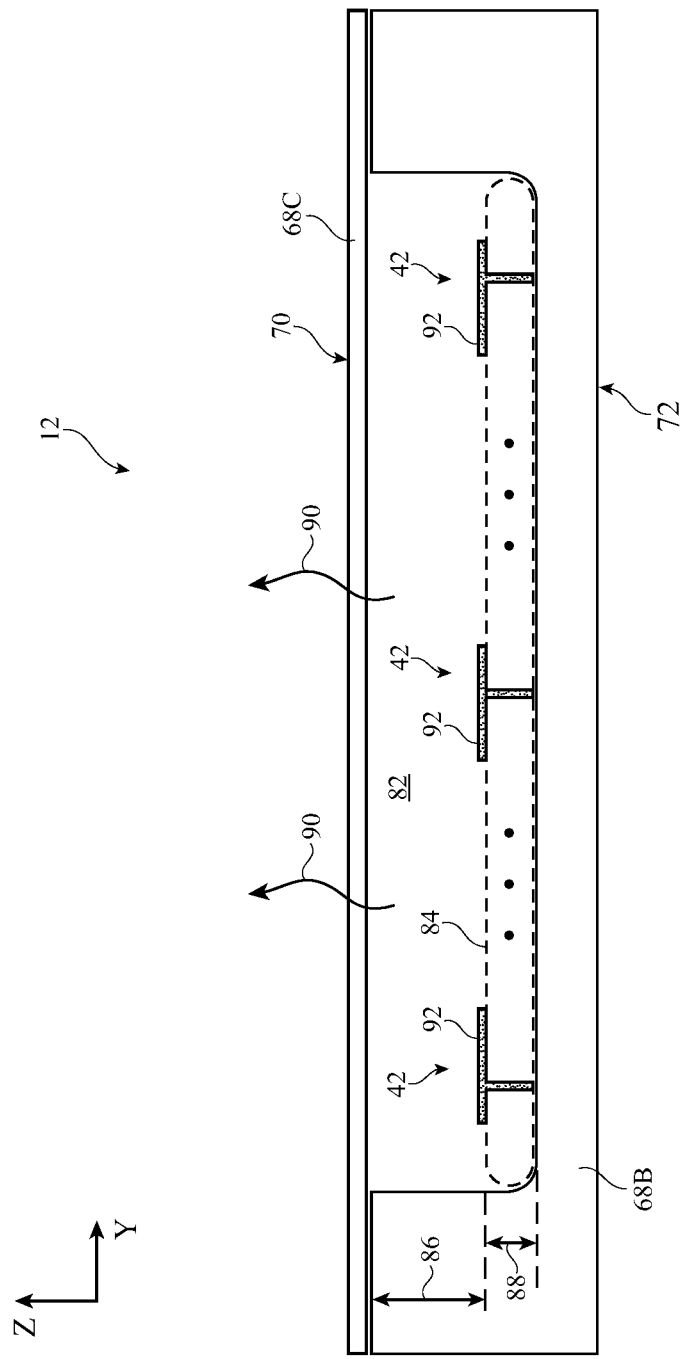
FIG. 4 is a cross-sectional side view of illustrative wireless charging equipment having multiple antennas for wirelessly charging an electronic device placed on top of the wireless charging equipment in accordance with an embodiment.

FIG. 4 is a cross-sectional side view of wireless charging device 12 (e.g., as taken across line AA' and in the Y-Z plane of FIG. 3). As shown in FIG. 4, housing 68 of wireless charging device 12 may include base housing portion 68B and cover layer 68C. Base housing portion 68B may include dielectric materials, conductive materials, or combinations of conductive and dielectric materials. Cavity 82 may be formed extending from the top surface of base housing portion 68B. Antennas 42 may be formed within cavity 82. The portion of housing base 68B behind cavity 82 may be continuous with the side walls of housing base 68B or may be formed from separate structures than the side walls of housing base 68B.

Cover layer 68C may be placed over a top surface of housing base 68B. Antennas 42 may transmit wireless charging signals 90 for charging device 10 while device 10 is in contact with top surface 70 of cover layer 68C. Cover layer 70 may include dielectric materials to allow wireless charging signals 90 to pass through cover layer 70 for charging device 10. If desired, cover layer 70 may include pigmented material and/or one or more ink layers so that cover layer 70 is opaque to visible light (e.g., to hide cavity 82 from view of a user and to enhance the aesthetic appearance of device 12 while still allowing charging signals 90 to pass through the cover layer). Wireless charging signals 90 may be transmitted at any desired frequencies (e.g., at frequencies between 700 MHz and 2700 MHz, in a 2.4 GHz frequency band, a 5 GHz frequency band, a 60 GHz frequency band, a 243 GHz frequency band, a 2.45 GHz frequency band, a 5.75 GHz frequency band, in an ISM band, in an unlicensed frequency band, at frequencies above 700 MHz, frequencies below 700 MHz, frequencies above 400 GHz, frequencies below 400 GHz, frequencies from 1-1000 MHz, frequencies above 100 MHz, frequencies above 500 MHz, frequencies above 1 GHz, frequencies from 1-400 GHz, frequencies below 100 GHz, or any other frequencies of interest).

Antennas 42 may include antenna resonating elements 92. Resonating elements 92 may be formed at a distance 88 from the rear wall of cavity 82. Distance 88 may be selected to adjust the radio-frequency performance of antennas 42. As an example, distance 88 may be between 0.5 mm and 1 cm (e.g., in scenarios where a 5.8 GHz frequency is used), may be less than 10 mm, or may be any other desired distance. If desired, a dielectric support structure 84 may be formed in cavity 82 to support antennas 42. Antenna resonating elements 92 may be formed on a top surface of support structure 84. Support structure 84 may be formed from any desired dielectric materials (e.g., plastic, polymer, flexible printed circuit board substrate, foam, ceramics, glass, etc.). Support structure 84 may have openings or via structures that allow antenna resonating elements 92 to be coupled to transceiver circuitry 36 and/or ground plane structures in charging device 12. Support structure 84 may include a single structure that supports each of antennas 42 in cavity 82 or may include separate structures that each support a corresponding antenna 42.

The portion of cavity 82 that is interposed between antenna resonating elements 92 and cover layer 70 may be filled with air or any other desired dielectric. For example, cavity 82 may be filled with a dielectric support structure such as non-conductive foam or other materials that protect antennas 42 and support cover layer 68C. Antenna resonating elements 92 may be formed within cavity 82 at a distance 86 from cover layer 70. Distance 86 may be selected to provide a desired amount of directionality for wireless charging signals 90. For example, if distance 86 is too short, wireless charging signals 90 may unfocused with respect to the device 10 that is placed on top surface 70. If distance 86 is too long, wireless power transfer may be excessively inefficient. As an example, distance 86 may be between 2 mm and 20 mm (e.g., in scenarios where a 5.8 GHz frequency is used), may be less than 20 mm, or may be any other desired distance to optimize efficiency and directionality of wireless charging signals 90.

Charging device 12 may include multiple antennas 42 in cavity 82 to ensure that at least one antenna 42 is within wireless charging range of device 10 regardless of where device 10 is placed on top surface 70. The antennas within cavity 82 may be arranged in any desired manner. For example, antennas 42 may be evenly or unevenly distributed across surface 70 of charging device 12, may be concentrated within a portion of charging device 12, may be arranged in a predetermined shape across surface 70, may be concentrated within multiple areas across surface 70, etc. If desired, antennas 42 may be arranged in a pattern such as an array, grid, or matrix. As an example, antennas 42 may be arranged in an array having rows and columns of antennas. Distributing multiple antennas 42 across charging device 12 may, for example, allow charging device 12 to cover wireless charging for situations in which device 10 is placed at any desired location across surface 70.

Figure 5:
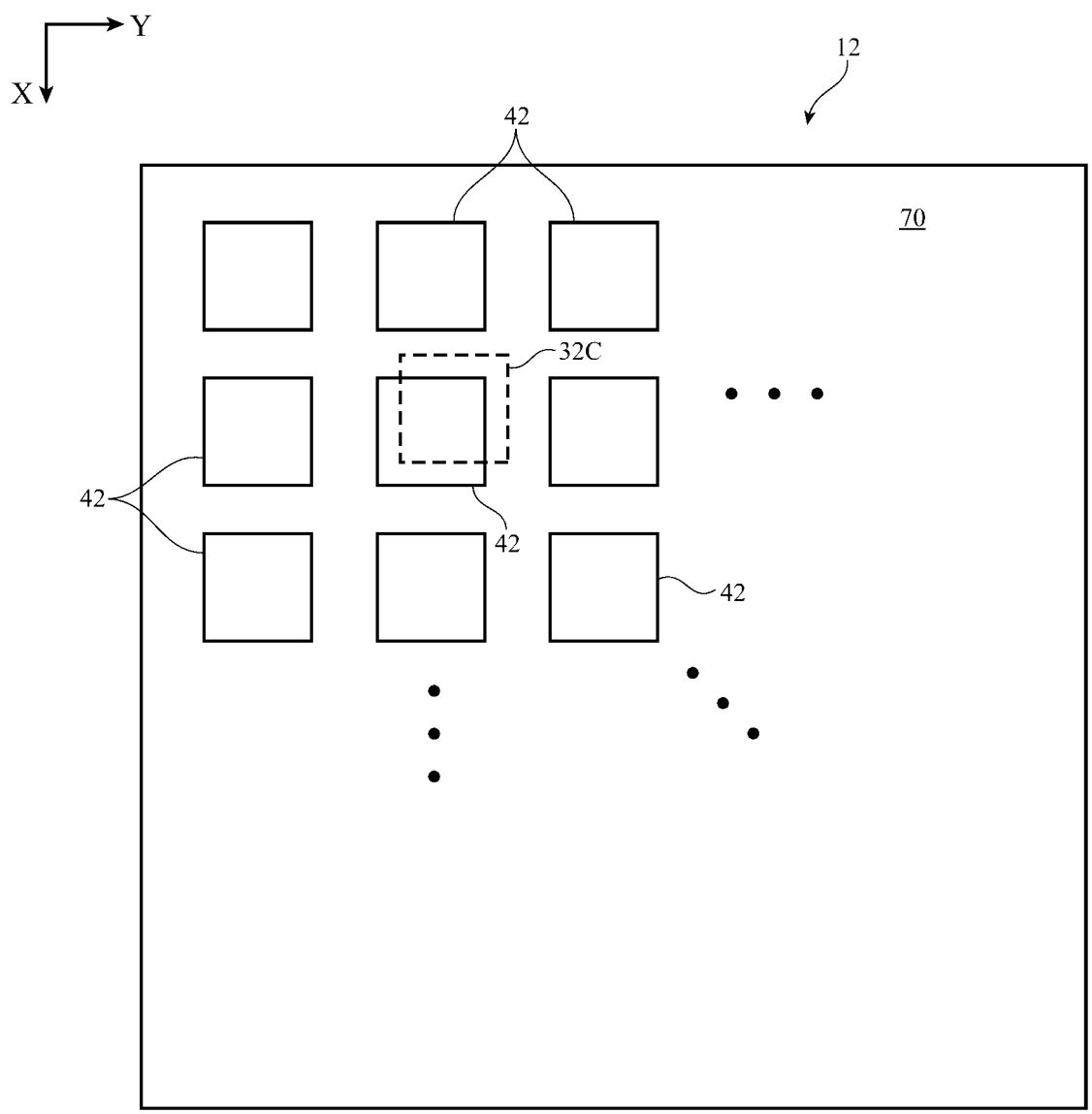
FIG. 5 is a top-down view of illustrative wireless charging equipment having an array of wireless charging antennas in accordance with an embodiment.

FIG. 5 is a top-down view of wireless charging device 12 having an array of charging antennas 42 (e.g., as taken in direction B and in the X-Y plane of FIG. 3). As shown in FIG. 5, antennas 42 may be laterally distributed across surface 70 in an array having rows and columns. Antennas 42 may be evenly distributed in the array (e.g., the distance of the gap between each antenna in the array may be equal) or may be unevenly distributed in the array (e.g., the distance of the gaps between each antenna in the array may be unequal). As an example, the gap between each antenna 42 in the array may be between 20 and 30 mm. When device 10 is placed on top surface 70 for charging, a corresponding antenna 32C may overlap with one or more antennas 42 on charging device 42. Antenna 32C may be an antenna on device 10 that is dedicated to receiving wireless charging signals or may be an antenna that handles wireless charging signals and other radio-frequency signals. If desired, multiple antennas 32C may be used for wireless charging. For example, device 10 may include multiple antennas 32C having different polarizations for receiving the wireless charging signals. One or more antennas 42 may transmit wireless charging signals 90 for reception by antenna 32C. For example, the antenna 42 that overlaps antenna 32C on device 10, the antenna 42 that is closest to antenna 32C, or multiple antennas 42 in the vicinity of antenna 32C may transmit wireless charging signals 90 for device 10.

Figure 6:
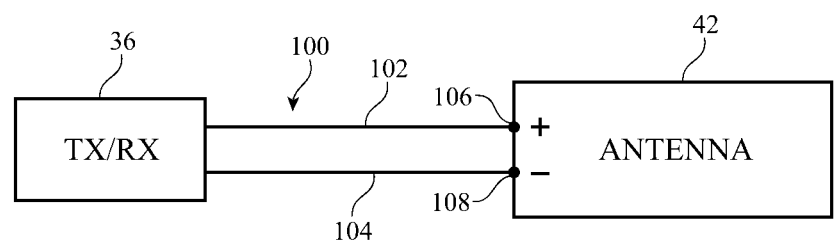
FIG. 6 is a schematic diagram of illustrative wireless circuitry that communicates using an antenna in accordance with an embodiment.

As shown in FIG. 6, wireless circuitry 36 may be coupled to each antenna 42 on charging device 12 using paths such as path 100 (e.g., a transmission line path). Each antenna 42 in charging device 12 may be coupled to wireless circuitry 36 via a respective transmission line path 100. If desired, switching circuitry may be interposed on path 100 to allow wireless circuitry 36 to convey wireless charging signals or radio-frequency signals over a selected set of antennas 42 (e.g., over a single antenna 42, over two antennas 42, over four antennas 42, over every antenna 42, etc.).

Wireless circuitry 36 may be coupled to control circuitry 18 so that circuitry 36 can be controlled by circuitry 18 during wireless power transfer operations and/or wireless communications operations. Path 100 may include one or more transmission lines. As an example, signal path 100 of FIG. 6 may be a transmission line having a first conductor such as line 102 (e.g., a positive signal conductor) and a second conductor such as line 104 (e.g., a negative signal conductor or ground signal conductor). Lines 102 and 104 may form parts of a coaxial cable or a microstrip transmission line (as examples). A matching network formed from components such as inductors, resistors, and capacitors may be used in matching the impedance of antenna 42 to the impedance of transmission line 100. Matching network components may be provided as discrete components (e.g., surface mount technology components) or may be formed from electronic device housing structures, printed circuit board structures, traces on plastic supports, etc. Components such as these may also be used in forming filter circuitry in antenna 42 if desired.

Transmission line 100 may be coupled to antenna feed structures associated with antenna 42. As an example, antenna 42 may form a patch antenna, a dipole antenna, or other antenna having an antenna feed with a first antenna feed terminal such as terminal 106 (e.g., a positive feed terminal) and a second antenna feed terminal such as terminal 108 (e.g., a negative or ground feed terminal). First transmission line conductor 102 may be coupled to first antenna feed terminal 106 and second transmission line conductor 104 may be coupled to second antenna feed terminal 108. Other types of antenna feed arrangements may be used if desired. The illustrative feeding configuration of FIG. 6 is merely illustrative.

Figure 7:
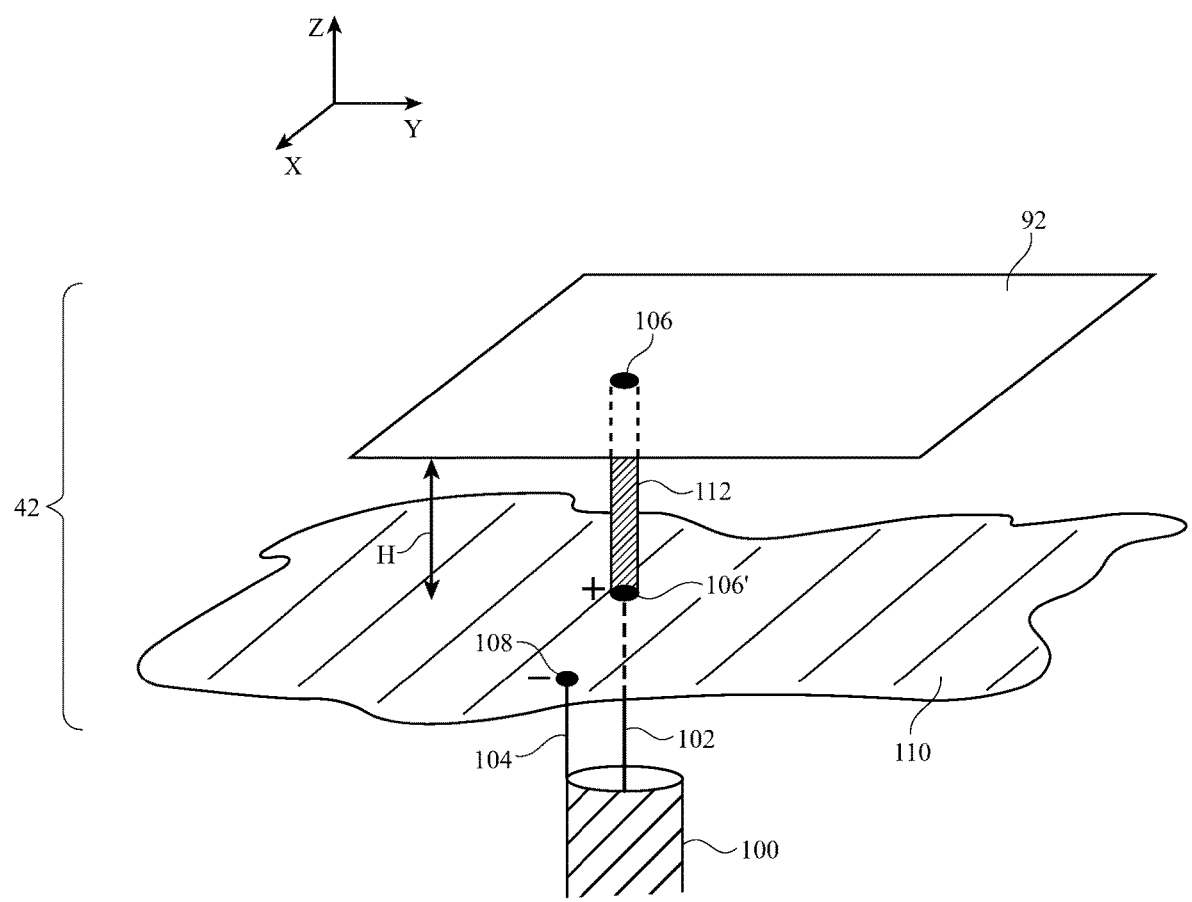
FIG. 7 is a perspective view of an illustrative patch antenna for transmitting wireless charging signals in accordance with an embodiment.

If desired, patch antenna structures may be used for implementing antenna 42. An illustrative patch antenna is shown in FIG. 7. As shown in FIG. 7, patch antenna 42 may have a patch antenna resonating element such as patch 92 that is separated from a ground plane structure such as ground 110. Antenna patch resonating element 92 and ground 110 may be formed from metal foil, machined metal structures, metal traces on a printed circuit or a molded plastic carrier, electronic device housing structures, or other conductive structures in charging device 12. Patch resonating element 92 may be separated from ground 110 by dielectric support structure 84 and/or portions of base housing structure 68B (as shown in FIG. 4). Patch resonating element 92 may have any desired size. For example, patch resonating element 92 may have a length and a width between 10 mm and 20 mm, or any other desired size. If desired, patch resonating element 92 may have any desired shape (e.g., a circular shape, oval shape, square shape, rectangular shape, polygonal shape, etc.).

Antenna patch resonating element 92 may lie within a plane such as the X-Y plane of FIGS. 3 and 5. Ground 110 may line within a plane that is substantially parallel to the plane of antenna patch resonating element (patch) 92. Patch 92 and ground 110 may therefore lie in separate parallel planes that are separated by a distance H. Distance H may be equal to distance 88 of FIG. 4 (e.g., in scenarios where ground plane 110 is formed on the rear surface of cavity 82) or may be greater than distance 88 (e.g., in scenarios where ground plane 110 is embedded within base housing portion 68B or otherwise formed below the rear surface of cavity 82).

Conductive path 112 may be used to couple terminal 106' to terminal 106. Antenna 42 may be fed using transmission line 100 having positive conductor 102 coupled to terminal 106' and thus terminal 106 and with a ground conductor 104 coupled to terminal 108. Other feeding arrangements may be used if desired. Moreover, patch 92 and ground 110 may have different shapes and orientations (e.g., planar shapes, curved patch shapes, patch element shapes with non-rectangular outlines, shapes with straight edges such as squares, shapes with curved edges such as ovals and circles, shapes with combinations of curved and straight edges, etc.). If desired, a via, through-hole, or other opening may be formed in ground plane 110 to allow feed line 102 to couple to path 112 without contacting ground plane 110.

The arrangement of FIG. 7 in which antenna 42 is provided with a single feed may result in transmitted wireless charging signals 90 having a single polarization. Transmitting wireless charging signals 90 with a single polarization may reduce wireless charging efficiency for device 10 at certain orientations of device 10 with respect to charging device 12. To enhance the frequency coverage and polarizations handled by patch antenna 42, antenna 42 may be provided with multiple feeds.

Figure 8:
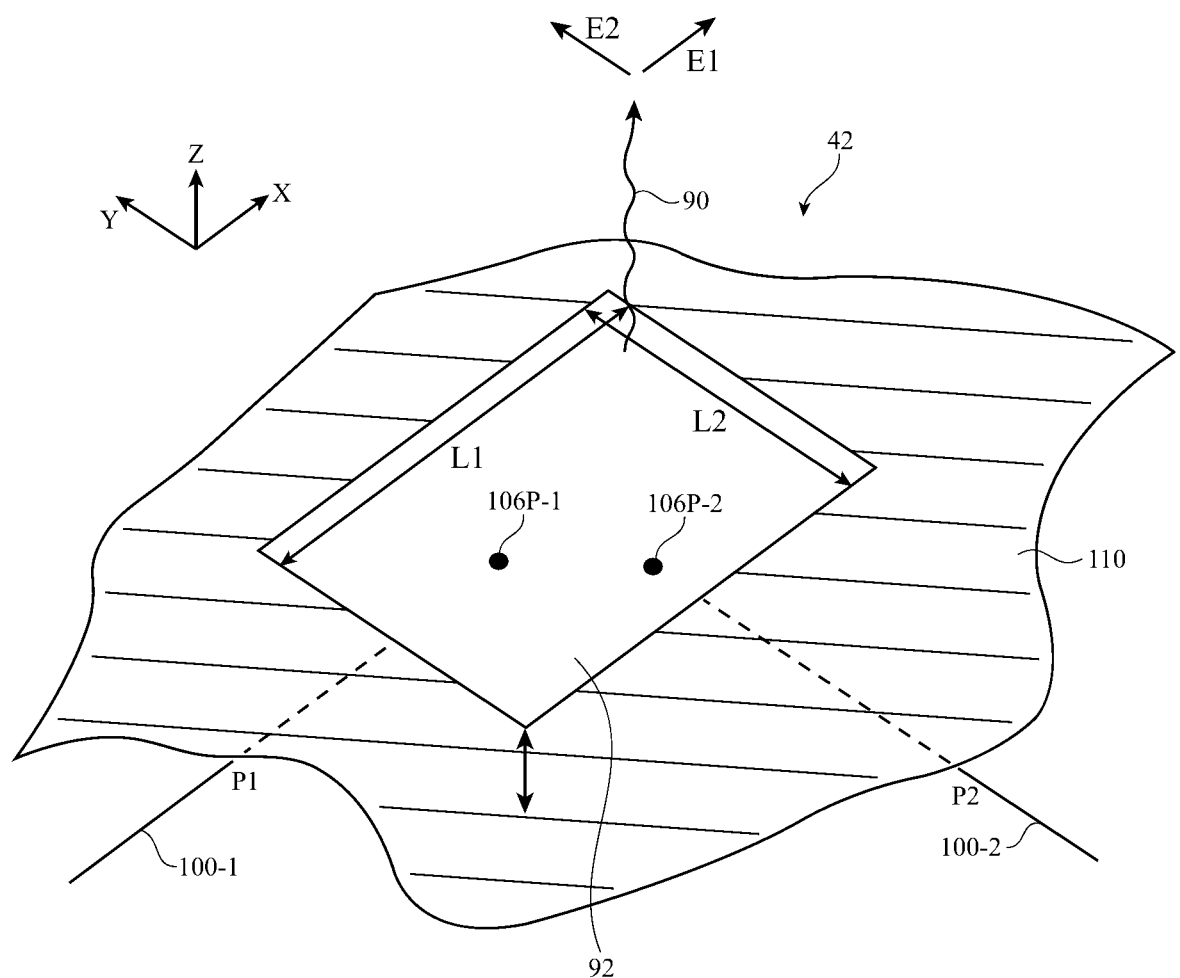
FIG. 8 is a perspective view of an illustrative patch antenna with dual ports for transmitting wireless charging signals in accordance with an embodiment.

An illustrative patch antenna with multiple feeds is shown in FIG. 8. As shown in FIG. 8, antenna 42 may have a first feed at antenna port P1 that is coupled to transmission line 100-1 and a second feed at antenna port P2 that is coupled to transmission line 100-2. The first antenna feed may have a first ground feed terminal coupled to ground 110 and a first positive feed terminal 106-P1 coupled to patch antenna resonating element 92. The second antenna feed may have a second ground feed terminal coupled to ground 110 and a second positive feed terminal 106-P2.

Patch 92 may have a rectangular shape with a pair of longer edges running parallel to dimension X and a pair of perpendicular shorter edges running parallel to dimension Y. The dimension of patch 92 in dimension X is L1 and the dimension of patch 92 in dimension Y is L2. With this configuration, antenna 42 may be characterized by orthogonal polarizations and multiple frequencies of operation.

When using the first antenna feed associated with port P1, antenna 42 may transmit and/or receive antenna signals in a first communications band at a first frequency (e.g., a frequency at which a half of a wavelength is equal to dimension L1). These signals may have a first polarization (e.g., the electric field E1 of antenna signals 90 associated with port P1 may be oriented parallel to dimension X). When using the antenna feed associated with port P2, antenna 42 may transmit and/or receive antenna signals in a second communications band at a second frequency (e.g., a frequency at which a half of a wavelength is equal to dimension L2). These signals may have a second polarization (e.g., the electric field E2 of antenna signals 90 associated with port P2 may be oriented parallel to dimension Y so that the polarizations associated with ports P1 and P2 are orthogonal to each other). During wireless power transfer operations and/or wireless communications using system 10, device 12 may use one or more antennas such dual-polarization patch antenna 42 of FIG. 8 and may use port P1, port P2, or both port P1 and P2 of each of these antennas. By transmitting wireless charging signals 90 with dual polarizations, wireless charging efficiency of device 10 may be optimized regardless of the orientation of device 10 relative to charging device 12.

If desired, one, multiple, or all of antennas 42 on charging device 12 may be provided with the dual port arrangement of FIG. 8. In another suitable arrangement, antennas 42 may be provided with a single feed and may be oriented along different directions so that the sum of the wireless charging signals 90 transmitted by antennas 42 has different polarities. For example, each adjacent pair of antennas 42 on charging device 12 may include a first single feed antenna 42 that transmits charging signals 90 that are horizontally polarized and a second single feed antenna 42 that transmits charging signals 90 that are vertically polarized. If desired, charging antenna 32C on device 10 may include a dual port arrangement such as that shown in FIG. 8 for receiving charging signals at different polarities. Device 10 may, if desired, include multiple adjacent antennas having different polarities (e.g., a first antenna 32C that receives vertically polarized charging signals and a second antenna 32C that receives horizontally polarized charging signals). This example is merely illustrative and, in general, any desired combination of single and dual feed antennas 42 may be used for charging device 12. In general, antennas 42 may include any desired type of antenna that transmits wireless charging signals 90 with any desired polarization (e.g., dipole antennas, monopole antennas, loop antennas, inverted-F antennas, etc.). If desired, antennas 42 may transmit circularly polarized or elliptically polarized wireless charging signals 90.

Transmitting wireless power signals 90 using every antenna 42 in charging device 12 may be inefficient and consume excessive power. For example, when wireless device 10 is placed at location 74 (FIG. 3), antennas 42 that are not within wireless charging range of location 74 (e.g., antennas 42 at locations 76 or 78) need not transmit wireless charging signals 90, since signals transmitted by those antennas are unlikely to be received by device 74. In order to conserve power consumption in the system, charging device 12 may actively select one or more antennas 42 for transmitting wireless charging signals 90.

Figure 9:
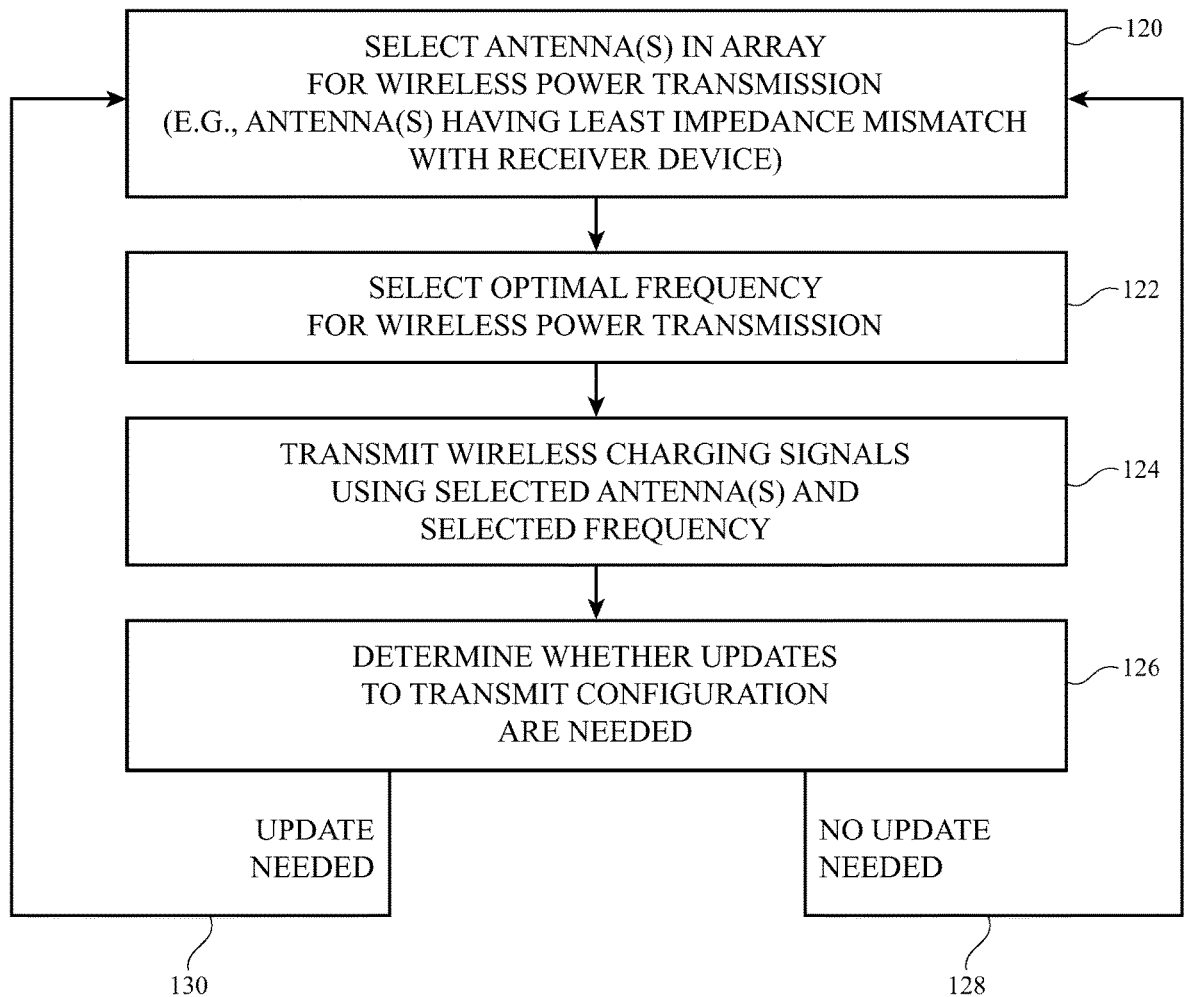
FIG. 9 is a flow chart of illustrative steps that may be performed by wireless charging equipment having an array of antennas for wirelessly charging an electronic device in accordance with an embodiment.

FIG. 9 is a flow chart of illustrative steps that may be performed by wireless charging device 12 for transmitting wireless charging signals to device 10. The steps of FIG. 9 may, for example, be performed continuously (e.g., even when no device 10 has been placed on top surface 70), or may be performed once device 10 has been placed on top surface 70 for charging.

At step 120, charging device 12 may select one or more antennas 42 in the array of antennas for wireless power transmission. For example, device 12 may select one or more antennas 42 in the vicinity of charging device 10 for transmitting wireless charging signals 90. If desired, charging device 12 may select the antennas for wireless power transmission based on antenna impedance information gathered from each of the antennas 42. For example, the gathered impedance information may identify when device 10 has been placed onto surface 70 and may identify which antennas 42 are within wireless charging range of device 10.

At step 122, charging device 12 may select an optimal frequency for transmitting wireless charging signals 90. If desired, charging device 12 may select the optimal frequency for transmission based on impedance matching information gathered from the selected antennas 42 (e.g., as selected at step 120). If desired, charging device 12 may select multiple frequencies for transmission (e.g., in scenarios where dual port antennas such as those shown in FIG. 8 are used).

At step 124, charging device 12 may transmit wireless charging signals 90 using the selected antennas 42 (e.g., as selected at step 120) and at the selected frequency (e.g., as selected at step 122). The charging signals may be transmitted to device 10 through cover layer 68C as shown in FIG. 4, for example.

At step 126, charging device 12 may determine whether updates to the wireless power transmission configuration are needed. For example, device 12 may identify whether a different transmit frequency is needed or whether other antennas should be selected for transmission. If desired, device 12 may determine whether updates are needed based on impedance matching information gathered from antennas 42. For example, the gathered impedance matching information may identify that device 10 is no longer placed on surface 70 or may identify that device 10 has moved to a different location on surface 70. If charging device 12 determines that an update to the wireless power transmit configuration is needed, processing may loop back to step 120 as shown by path 130 to select different antennas 42 and/or different transmission frequencies for wireless charging. If charging device 12 determines that no updates are needed, processing may loop back to step 124 as shown by path 128 to continue wirelessly charging device 10 using the selected antennas and frequency.

Figure 10:
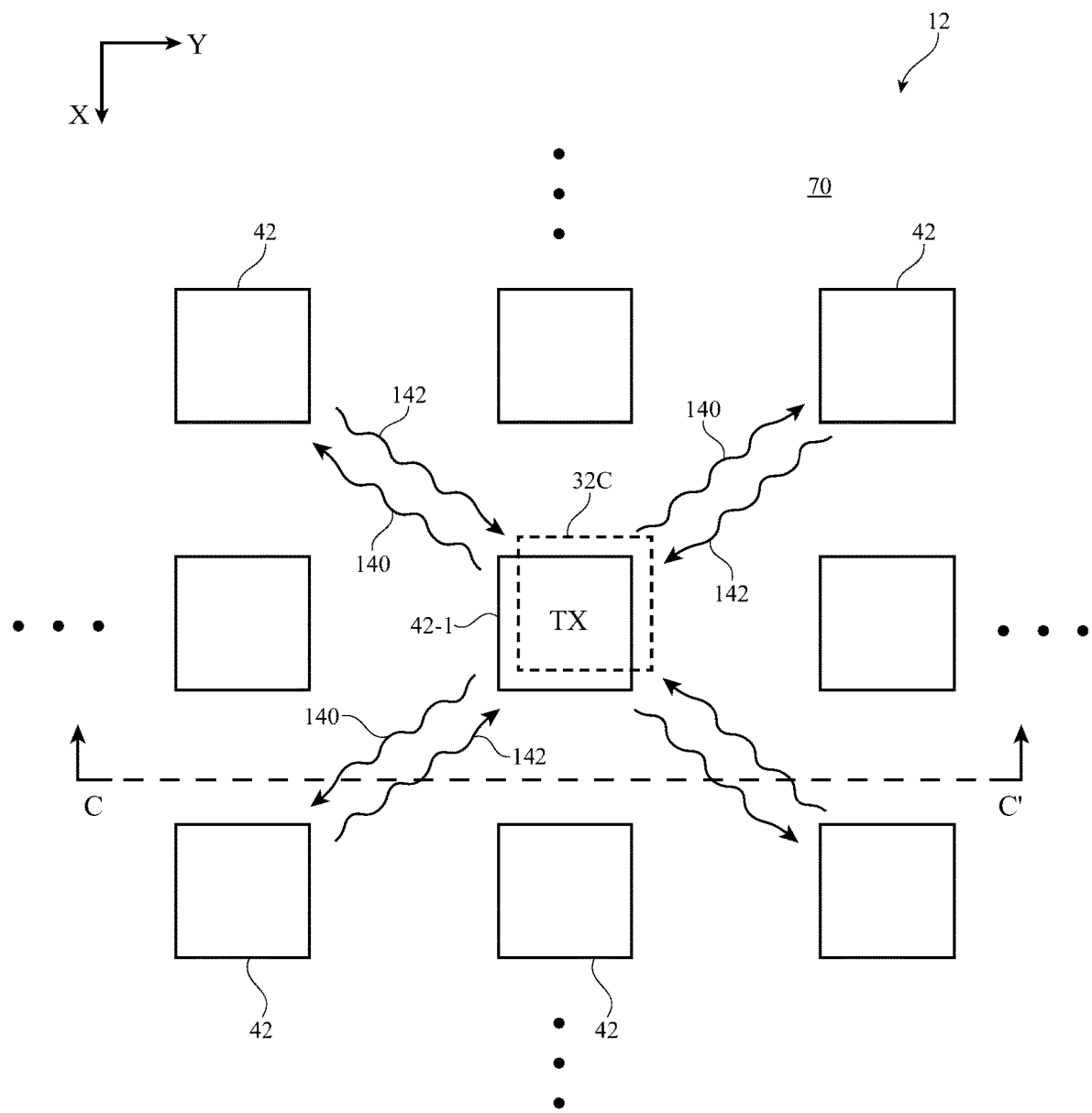
FIG. 10 is a top-down view of illustrative wireless charging equipment having antennas that are configured to form a guard ring structure in accordance with an embodiment.

If desired, antennas 42 that are adjacent to a selected antenna may be configured to form a filter such as a block filter for the selected transmit antenna. FIG. 10 is a top-down view (e.g., in the X-Y plane of FIGS. 3, 5, 7, and 8) showing how antennas 42 that are adjacent to a selected antenna may form a block filter for the selected antenna.

As shown in FIG. 10, antenna 42-1 on charging device 12 may be selected for wireless power transmission (TX). Antenna 42-1 may, for example, be within wireless charging range of charging antenna 32C on charged device 10. Antenna 42-1 may be selected, for example, based on impedance information gathered by each of antennas 42.

Selected antenna 42-1 may transmit wireless charging signals 90. A set of antennas 42 that surrounds transmit antenna 42-1 may not transmit any wireless charging signals (e.g., the set of antennas may be switched out of use or transceiver circuitry coupled to those antennas may be disabled). A portion 140 of the transmitted charging signals 90 may be transmitted laterally outwards and towards the set of antennas 42 surrounding transmit antenna 42-1.

The set of antennas 42 surrounding transmit antenna 42-1 may have a frequency dependent impedance and may exhibit a frequency response (e.g., based on the geometry of the corresponding antenna resonating element, a distance between the resonating element and ground, etc.). At the frequency of operation of transmit antenna 42-1, the presence of the set of surrounding antennas 42 may cause an impedance discontinuity at the location of the surrounding antennas. Such an impedance discontinuity may tend to block signals 140 from leaking laterally outwards in the X-Y plane and out of charging device 12. As an example, the set of surrounding antennas may exhibit an impedance that is less than the impedance of the space between the set of surrounding antennas and the transmit antenna. This may allow the set of surrounding antennas to form a low impedance path to ground for wireless signals 140, causing an effective short of transmitted wireless signals 140 to ground at the location of the surrounding antennas that blocks wireless signals 140 from travelling outwards past the surrounding antennas. As another example, the set of surrounding antennas may exhibit an impedance that is much greater than the impedance of the space between the surrounding antennas and the transmit antenna (e.g., an infinite impedance). This may also serve to block wireless signals 140 from travelling outwards past the surrounding antennas. Forming an impedance discontinuity for laterally radiated signals 140 using the set of antennas surrounding the transmit antenna may prevent undesirable signal loss out of the sides of charging device 12 (e.g., preventing absorption of the charging signals by people or objects in the vicinity of charging device 12) and may increase the charging efficiency of charging device 12. In this way, the set of antennas surrounding the transmit antenna may form a block filter or guard ring structure for the transmit antenna.

In the example of FIG. 10, the set of surrounding antennas that forms the guard ring for selected antenna 42-1 is abutting selected antenna 42-1 (e.g., the antennas in the guard ring are located in immediately preceding and succeeding rows and columns as selected antenna 42-1). If desired, the antennas that form the block filter or guard ring may be any desired antennas adjacent to selected antenna 42-1 (e.g., the antennas in the guard ring may be the set of antennas that are closest to selected antenna 42-1 in scenarios where the antennas are not arranged in a grid). The guard ring may include one, two, three, four, or more than four antennas 42. This is merely illustrative and, in general, the antennas that form the guard ring may include any of the antennas in the array. If desired, one or more other antennas may be interposed between the selected antenna and the antennas in the guard ring. The guard ring may have any desired shape (e.g., the antennas in the guard ring may be arranged in a square, rectangle, triangle, circle, oval, or any other desired shape around or adjacent to the selected antenna or may be arranged in a linear pattern, curved pattern, or any other desired pattern).

Figure 11:
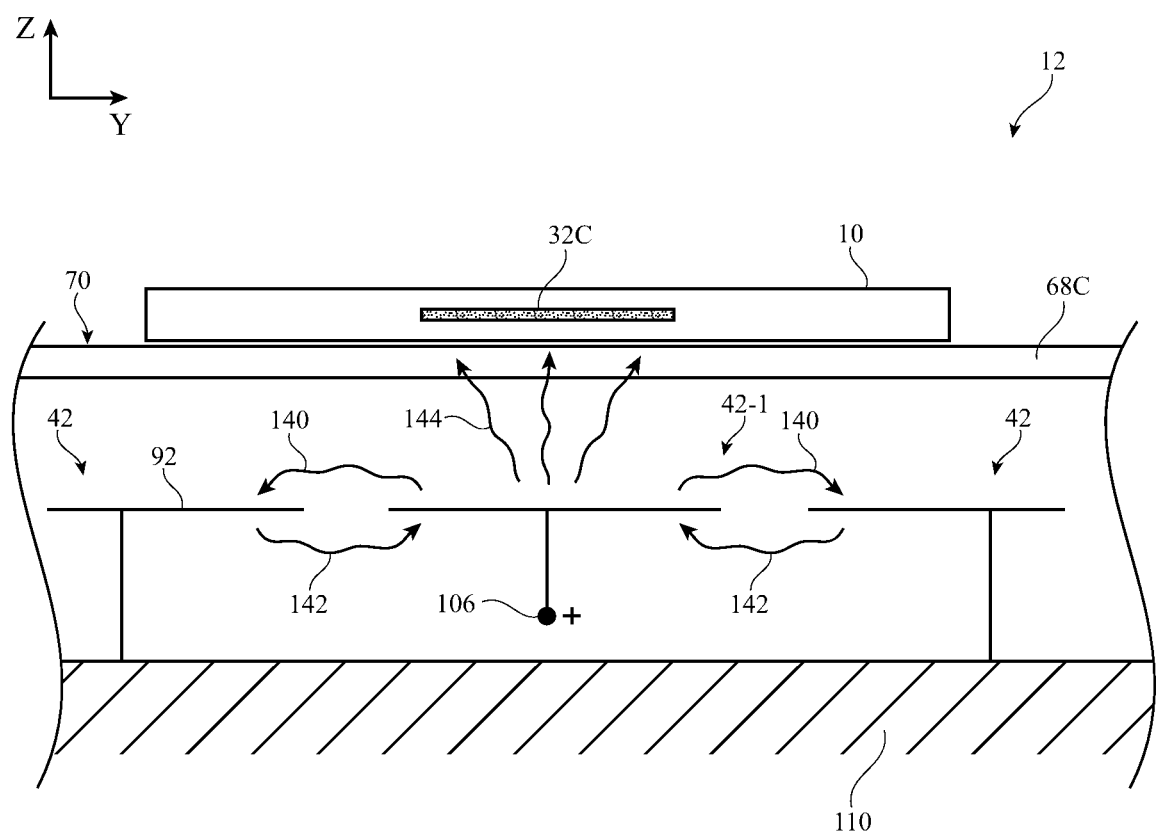
FIG. 11 is a cross-sectional side view of illustrative wireless charging equipment having antennas that are configured to form a guard ring structure in accordance with an embodiment.

FIG. 11 is a cross-sectional side view of charging device 12 when placed into contact with device 10 (e.g., as taken across line CC' of FIG. 10 and in the Y-Z plane of FIG. 3). As shown in FIG. 11, device 10 may be placed on surface 70 of charging device 12. Antenna 32C may be within charging distance of selected transmit antenna 42-1. Antenna 42-1 may be fed wireless charging signals over feed terminal 106. A portion 144 of charging signals 90 transmitted by selected antenna 42-1 may be transmitted towards charging antenna 32C. Device 10 may receive charging signals 144 and use the charging signals to power battery 46, for example. Portion 140 of charging signals 90 may be transmitted towards adjacent antennas 42. Adjacent antennas 42 may not be fed any wireless charging signals from transceiver circuitry 36. Adjacent antennas 42 may form an impedance discontinuity at the frequency of operation of transmit antenna 42-1. This impedance discontinuity may, for example, form a low impedance path to ground for signals 140 at the location of the adjacent antennas. This low impedance path to ground may serve to short charging signals 140 to ground 110 at the location of the adjacent antennas 42, effectively serving to trap or reflect signals 140 back towards selected antenna 42-1 as shown by paths 142. In this way, antennas 42 adjacent to transmit antenna 42-1 may form a part of a guard ring that blocks charging signal portions 140 from escaping out the side of device 12, while allowing charging signal portion 144 to be received at antenna 32C for charging device 10.

Figure 12:
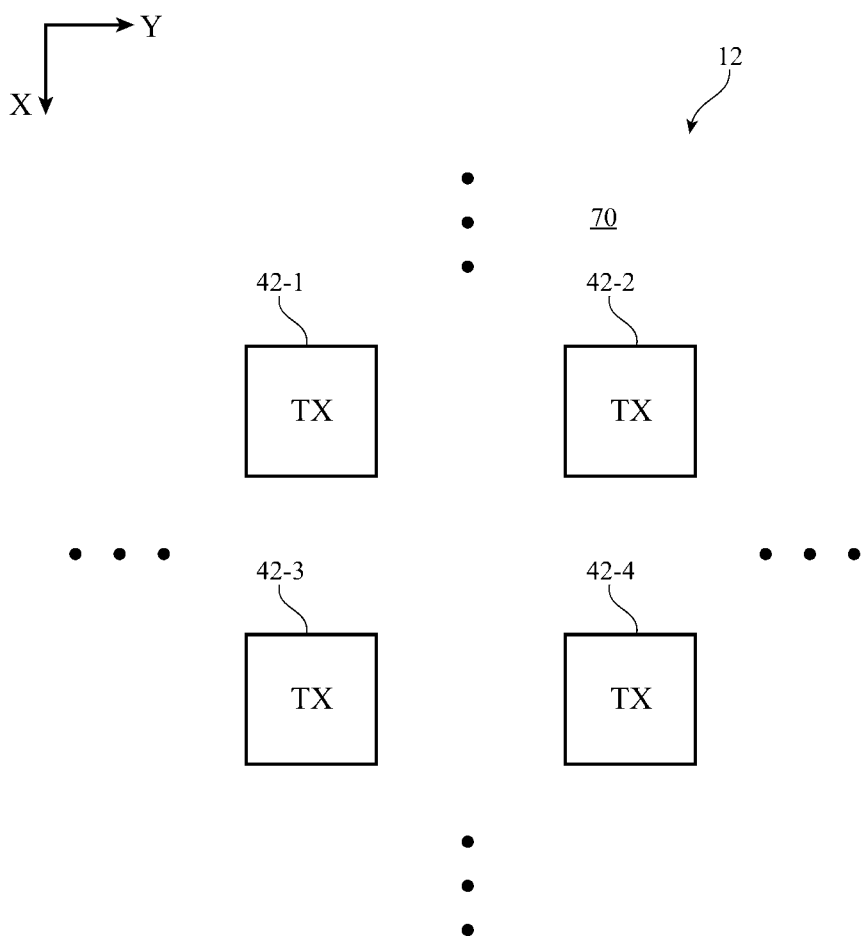
FIG. 12 is a top-down view of illustrative wireless charging equipment that concurrently transmits wireless charging signals using multiple adjacent antennas in accordance with an embodiment.

If desired, multiple adjacent antennas 42 may concurrently transmit wireless charging signals. FIG. 12 is a top-down view of charging device 12 (e.g., in the X-Y plane of FIG. 3) having multiple antennas selected for wireless power transmission.

As shown in FIG. 12, charging device 12 may select four adjacent antennas 42 (e.g., a first antenna 42-1, a second antenna 42-2, a third antenna 42-3, and a fourth antenna 42-4) for wireless power transmission (TX). Antennas 42-1, 42-2, 42-3, and 42-4 may, for example, be selected for transmission while processing step 120 of FIG. 9. Antennas 42-1, 42-2, 42-3, and 42-4 may be fed wireless charging signals 90 by wireless circuitry 36 and may transmit wireless charging signals 90 towards device 10. Antennas 42-1, 42-2, 42-3, and 42-4 may, for example, be switched into use using switching circuitry interposed between the antennas and wireless circuitry 36. Antennas 42-1, 42-2, 42-3, and 42-4 may wirelessly interact (e.g., via near field electromagnetic coupling) to redirect or focus wireless charging signals 90 towards antenna 32C on charged device 10.

Figure 13A:
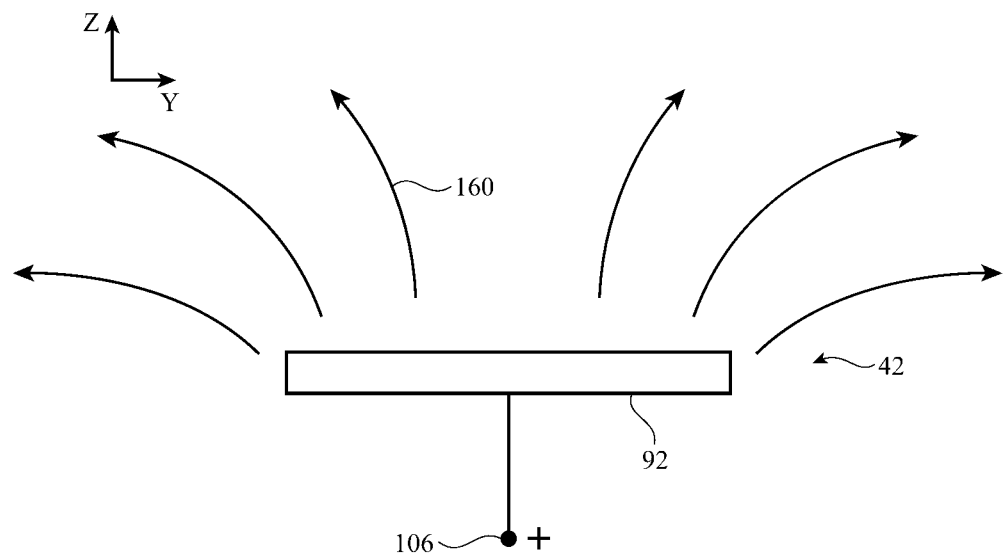
FIGS. 13A and 13B are side views showing how transmitting wireless charging signals using multiple antennas may concentrate the wireless charging signals on a charged electronic device in accordance with an embodiment.
Figure 13B:
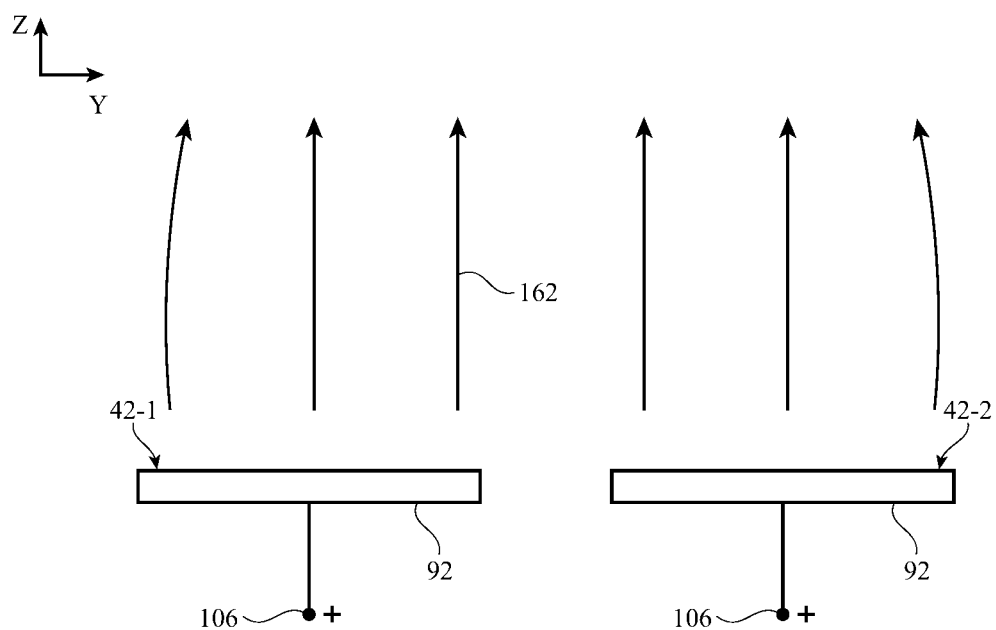

FIGS. 13A and 13B are side views (e.g., in the Z-Y plane of FIG. 3) showing how transmitting wireless charging signals 90 using multiple adjacent antennas 42 may serve to focus charging signals 90 towards receiver antenna 32C. In the example of FIG. 13A, a single antenna 42 is used to transmit wireless charging signals 90 (e.g., a single antenna 42 receives wireless charging signals 90 via feed terminal 106). Antenna 42 in FIG. 13A transmits wireless signals 90 along paths 160. Paths 160 may have excessive lateral spread along the Y-axis such that the wireless signals may leak out of charging device 12 or may otherwise be directed away from charged device 10 (e.g., thereby reducing the charging efficiency of the system).

In the example of FIG. 13B, antennas 42-1 and 42-2 are concurrently fed wireless charging signals 90 over feed points 106. Antenna 42-1 may electromagnetically interact with antenna 42-2 (e.g., via near-field coupling) such that charging signals 90 are collectively transmitted by both antennas 42-1 and 42-2 along paths 162. Paths 162 may exhibit less lateral spread along the Y-axis than paths 160 in FIG. 13A. In other words, charging signals 90 may be more focused towards receiver device 10 and less leakage out of device 12 may occur relative to the example of FIG. 13A (e.g., the arrangement of FIG. 13B may result in improved charging efficiency relative to the arrangement of FIG. 13A).

Figure 14:
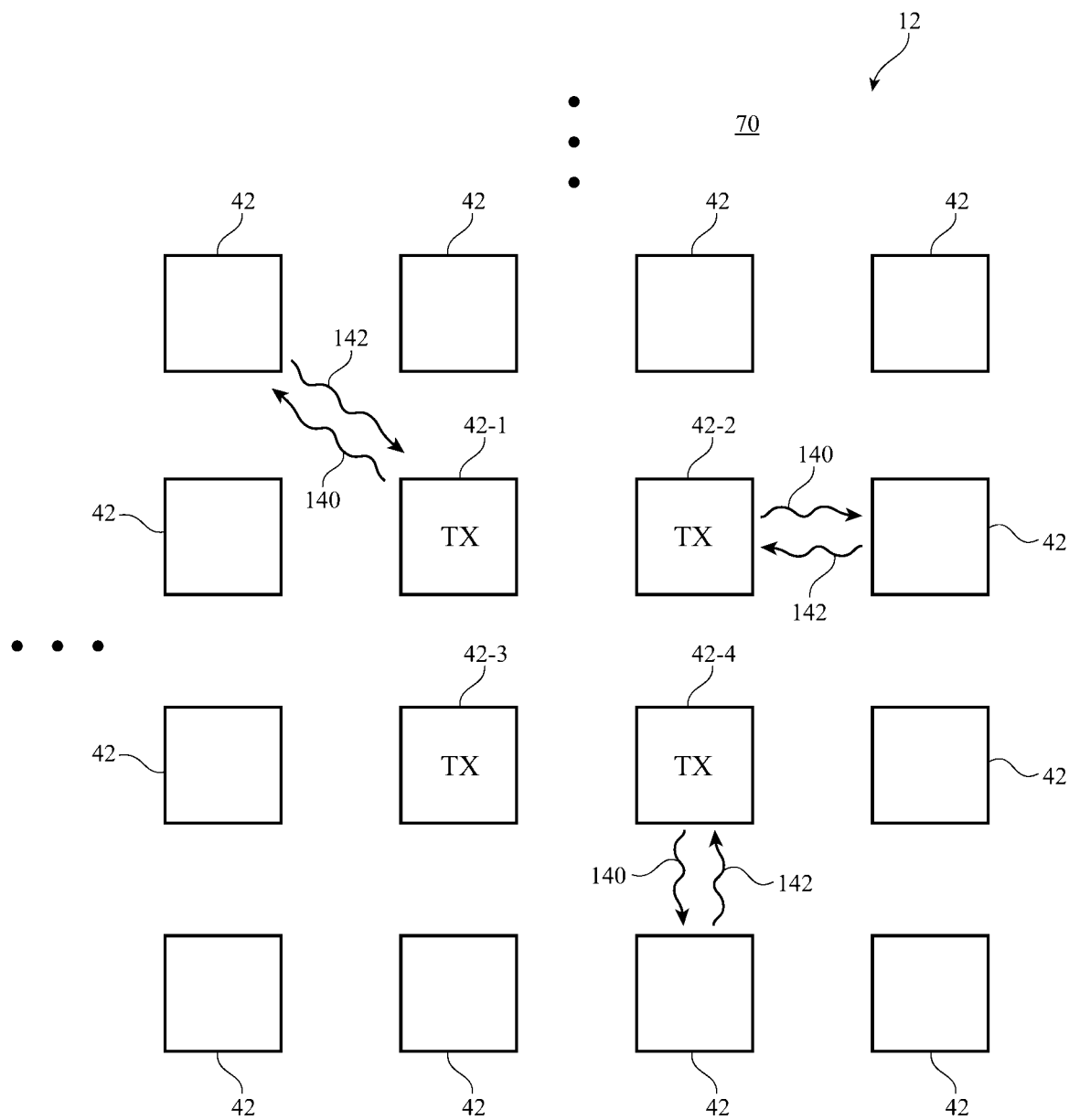
FIG. 14 is a top-down view of illustrative wireless charging equipment having multiple antennas that transmit wireless charging signals and that are surrounded by an antenna guard ring in accordance with an embodiment.

If desired, antennas 42 that are adjacent to selected antennas 42-1, 42-2, 42-3, and 42-4 may form a block filter for the selected antennas. FIG. 14 is a top-down view of charging device 12 having concurrently selected antennas and an antenna-based block filter.

As shown in FIG. 14, antennas 42-1, 42-2, 42-3, and 42-4 may be selected for transmission (e.g., as described in connection with FIG. 12). The antennas 42 that surround the selected antennas (e.g., a ring of antennas 42 around antennas 42-1, 42-2, 42-3, and 42-4) may be decoupled from wireless power transmitters 40 and may form a block filter for the selected antennas. For example, antennas 42-1, 42-2, 42-3, and 42-4 may transmit wireless charging signals 90 for charging device 10. A portion 140 of charging signals 90 may be transmitted outwards towards the surrounding ring of non-fed antennas. Surrounding antennas 42 may form an impedance discontinuity at the frequency of charging signals 90 that serves to block signals 140 from being transmitted past the surrounding antennas. This may serve to effectively trap signals 140 within the ring of surrounding antennas, as shown by paths 142.

In this way, antennas 42 that surround selected antennas 42-1 through 42-4 may block wireless signals 140 from leaking laterally in the X-Y plane out of charging device 12. This may prevent undesirable signal loss out of the sides of charging device 12 (e.g., preventing absorption of the charging signals by people or objects in the vicinity of charging device 12) and may increase the charging efficiency of charging device 12. By transmitting charging signals 90 using multiple antennas, wireless charging signals 90 may be focused on receiving device 10, thereby improving charging efficiency relative to scenarios where only one transmit antenna is selected (e.g., as described in connection with FIGS. 13A and 13B).

The example of FIG. 14 is merely illustrative. If desired, two, three, or more than four antennas 42 may be selected for wireless power transmission. The selected antennas may be arranged in any desired manner (e.g., across two adjacent rows and two adjacent columns, across two adjacent rows and in one column, across two adjacent columns and in one row, across one row, across one column, etc.).

If desired, control circuitry 18 may control switching circuitry to select one or more antennas for transmission and to disable one or more antennas so that the disabled antennas are configured to form the guard ring structure. The switching circuitry may, for example, be interposed between wireless power transmitter circuitry 40 and antennas 42 (e.g., on transmission lines 100).

Figure 15:
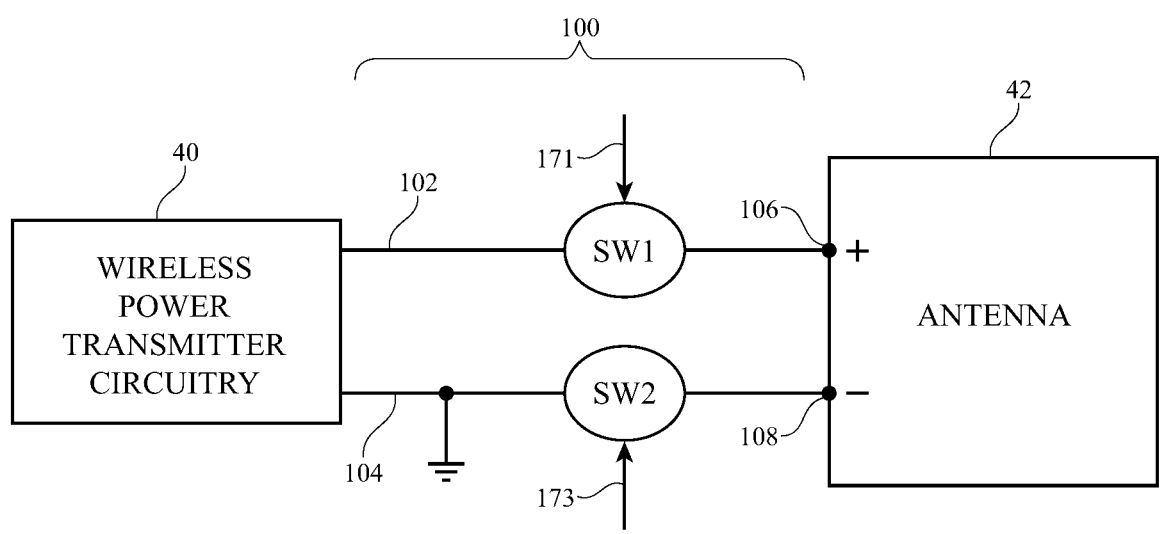
FIG. 15 is a diagram showing how switching circuitry may be interposed between wireless power transmitter circuitry and a corresponding antenna on wireless charging equipment for configuring the antenna to form a selected transmit antenna or part of a guard ring structure in accordance with an embodiment.

FIG. 15 is a diagram showing how switching circuitry may be interposed between wireless power transmitter circuitry 40 and a corresponding antenna 42. As shown in FIG. 15, a given antenna 42 may be coupled to wireless power transmitter circuitry 40 via a corresponding transmission line 100. Transmission line 100 may include a positive signal line 102 coupled between wireless power transmitter circuitry 40 and positive antenna feed terminal 106 on antenna 42. Transmission line 100 may include a ground signal line 104 coupled between wireless power transmitter circuitry 40 and ground antenna feed terminal 108 on antenna 42. A first switch such as switch SW1 may be interposed on positive signal line 102 between wireless power transmitter circuitry 40 and positive antenna feed terminal 106. A second switch such as switch SW2 may be interposed on ground signal line 104 between wireless power transmitter circuitry 40 and ground antenna feed terminal 106.

Storage and processing circuitry 16 (FIG. 1) may provide control signals 171 to control the state of switch SW1 and may provide control signals 173 to control the state of switch SW2. Storage and processing circuitry 16 may provide control signals 171 and 173 to configure antenna 42 to perform wireless power transmission or to form a portion of a block filter (e.g., guard ring structure). For example, storage and processing circuitry 16 may place switch SW1 in a closed (ON) state and switch SW2 in an open (OFF) state when the corresponding antenna 42 is selected for signal transmission (e.g., when antenna 42 is enabled for wireless power transmission). This may allow wireless charging signals to be transmitted by antenna 42 towards device 10. Storage and processing circuitry 16 may disable antenna 42 to configure antenna 42 to form a portion of the guard ring structure. Storage and processing circuitry 16 may disable antenna 42 by placing switch SW2 in a closed (ON) state. When switch SW2 is closed, laterally transmitted antenna signals 140 (FIGS. 10 and 14) may be shorted to ground at the location of antenna 42, thereby serving to block the laterally transmitted antenna signals from passing beyond the location of antenna 42. Switch SW1 may be placed in either the open or closed state when antenna 42 is configured to form a portion of the guard ring structure. In this way, storage and processing circuitry 18 may configure antenna 42 to serve as a portion of a guard ring structure or to serve as a selected antenna for wireless power transmission.

The example of FIG. 15 is merely illustrative. In general, any desired switching circuitry may be used to configure antenna 42 to transmit wireless charging signals or form a part of the guard ring structure. Similar switches may be coupled between wireless power transmitter circuitry 40 and each antenna 42 in wireless charging equipment 12 to allow equipment 12 to actively adjust which antenna 42 is used for signal transmission or used to form part of a guard ring structure in real time (e.g., as the position of device 10 relative to wireless charging equipment 12 is changed over time).

Storage and processing circuitry 16 may use any desired process for selecting which antennas 42 are configured to form the guard ring structure after the transmit antennas have been selected (e.g., after processing step 120 and before or concurrent with processing step 124 of FIG. 9). As one example, storage and processing circuitry 16 may configure one or more antennas 42 that are adjacent to the selected transmit antennas (e.g., each antenna 42 that is adjacent to the selected transmit antenna) to form the guard ring structure. As another example, storage and processing circuitry 16 may use predetermined information identifying which antennas 42 to configure to form the guard ring structure for a given corresponding transmit antenna. In this scenario, calibration data may be stored on storage and processing circuitry 16 that identifies which antennas 42 to configure to form the guard ring structure for each possible transmit antenna. The calibration data may be generated during factory testing or manufacture of device 10. For example, the radio-frequency transmit performance (e.g., wireless power transfer efficiency, reflection coefficients, etc.) of each antenna 42 may be tested in the factory while different combinations of other antennas 42 are configured to form part of the guard ring structure. The particular guard ring antennas that resulted in the optimal radio-frequency transmit performance for each antenna 42 may be stored in the calibration data and used during normal operation of charging equipment 12.

As another example, storage and processing circuitry 16 may toggle switch SW2 for each antenna 42 other than the selected transmit antennas to identify which antennas to configure to form the guard ring structure. In this scenario, storage and processing circuitry 16 may gather radio-frequency transmit performance information for the selected transmit antennas as the switches SW2 in different combinations of antennas 42 are selectively turned on. Storage and processing circuitry 16 may identify which combination of antennas 42 resulted in the optimal radio-frequency transmit performance of the selected transmit antennas and may configure that combination of antennas 42 to form the guard ring structure for subsequent wireless charging using the selected transmit antennas. In this way, storage and processing circuitry 16 may actively identify optimal antennas to configure to form the guard ring structure for a given transmit antenna even if some antennas 42 reflect wireless charging signals back towards the transmit antenna that are otherwise out of phase with the transmitted wireless charging signals. These examples are merely illustrative and, in general, any desired process may be used to identify which antennas 42 to configure to form the guard ring structure.

In general, effective wireless charging of device 10 occurs when there is a close impedance match between transmitting antenna 42 on charging device 12 and receiving antenna 32 on device 10. Impedance discontinuities in the vicinity of transmitting antenna 42 (e.g., between transmitting antenna 42 and the environment of antenna 42 above the antenna) cause signal reflections that prevent wireless power from being transferred efficiently. If desired, charging device 12 may include monitoring circuitry that is used to detect whether or not receive antenna 32 is efficiently coupled to transmitting antenna 42 for wireless charging (e.g., to gather data indicative of whether or not impedance discontinuities are present).

The monitoring circuitry may include impedance measurement circuitry that is used to characterize how well transmit antenna 42 is coupled to a receiving antenna 32. If the receiving antenna is not present or if a piece of metal or object other than receiving antenna 32 is present, an impedance discontinuity will be present at transmit antenna 42. In this case, the impedance measurement circuitry will gather impedance data or impedance information that identifies the presence of the discontinuity. The impedance measurement circuitry may gather impedance data by determining whether or not antenna 42 is coupled to antenna 32, by determining whether or not there is an impedance discontinuity at antenna 42, etc. When there is an impedance discontinuity present at antenna 42, there will be a spike in reflected transmit power at antenna 42. The impedance data can be gathered by measuring and analyzing the reflected power if desired. Because measurements of impedance mismatch are indicative of whether or not there is satisfactory coupling between transmit antenna 42 and receive antenna 32, gathering impedance data in charging device 12 may help determine which if any of antennas 42 in device 12 are well coupled to receiving antenna 32.

In order to gather the impedance data, the impedance measurement circuitry may make complex impedance measurements (e.g., measurements of complex impedance values having phases and magnitudes), measurements of reflected power (e.g., reflected power indicative of an impedance discontinuity), measurements of scattering parameters (sometimes referred to as S-parameters), or any other desired measurements for monitoring impedance discontinuities associated with transmitting antenna 42. Impedance data or other information about impedance discontinuities associated with transmit antenna 42 may be used to select one or more antennas for transmitting wireless charging signals 90 (e.g., while processing step 120 of FIG. 9).

Figure 16:
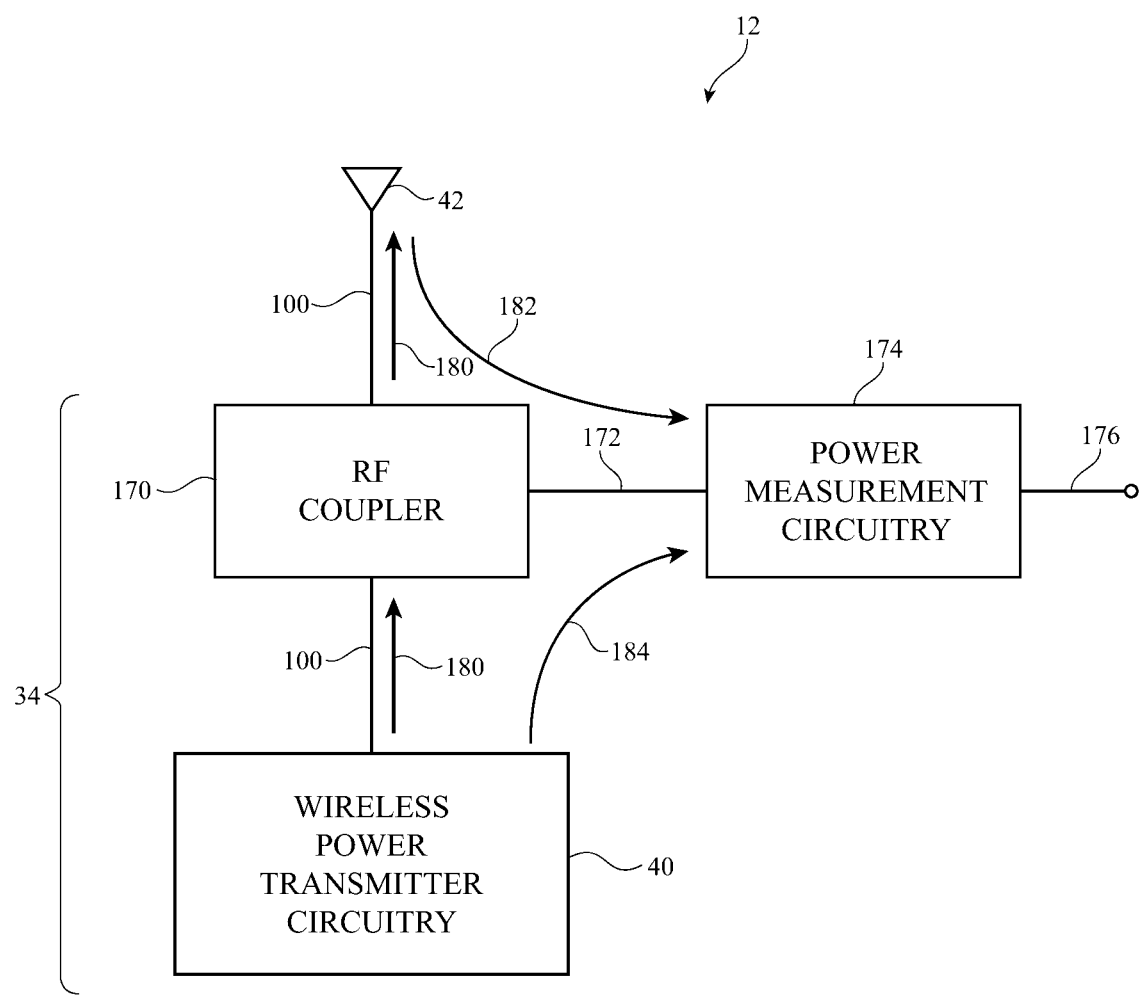
FIG. 16 is a schematic diagram showing how illustrative wireless charging circuitry may include circuitry for detecting impedance matching information associated with a charged device in accordance with an embodiment.

In one suitable arrangement, charging device 12 may include circuitry for monitoring reflected signal power to detect impedance discontinuities associated with transmit antenna 42. As shown in FIG. 16, wireless circuitry 34 on charging device 12 may include radio-frequency coupler circuitry 170. Radio-frequency coupler 170 may be interposed on transmission path 100 between a corresponding antenna 42 and wireless power circuitry 40. Wireless circuitry 34 may include power measurement circuitry 174 coupled to radio-frequency coupler 170 over transmission path 172. Power measurement circuitry 174 and coupler 170 may sometimes be referred to collectively herein as impedance measurement circuitry (e.g., because coupler 170 and circuitry 174 are used to gather impedance data for a corresponding antenna 42). The data gathered by the impedance measurement circuitry may, for example, identify whether or not there is an impedance discontinuity associated with antenna 42. If desired, portions of control circuitry 18 (FIG. 1) may form part of the impedance measurement circuitry. Power measurement circuitry 174 may be an integrated circuit such as an application specific integrated circuit, field-programmable gate array, microprocessor, or other discrete power measurement circuit. If desired, power measurement circuitry 174, RF coupler 170, and/or wireless power circuitry 40 may be formed on a common integrated circuit, application specific integrated circuit, field-programmable gate array, microprocessor, etc.

Wireless power circuitry 40 may transmit charging signals 90 or other signals over transmission line 100 as shown by arrows 180. Coupler 170 may route transmit signals 90 to antenna 42 so that these signals are transmitted over the air. Coupler 170 may also serve as a tap that routes a fraction of the transmitted signals from path 100 to power measurement circuitry 174 over path 172, as shown by arrow 184. If an impedance discontinuity exists at antenna 42, the impedance discontinuity will cause some or all of the signals transmitted to antenna 42 to be reflected back towards coupler 170. Coupler 170 may route the received signal reflections to power measurement circuitry 174 over path 172 as shown by arrow 182.

Power measurement circuitry 174 may receive the tapped transmit signals and the reflected power over path 172. Power measurement circuitry 174 may measure power levels of the tapped transmit signals and the reflected signals. Coupler 170 may, for example, include switching or other circuitry that routes reflected signals and transmit signals to power measurement circuitry 174 during respective time periods (e.g., so that circuitry 174 may distinguish between the reflected power and the transmit signals). Power measurement circuitry 174 may compare the measured power level of the transmitted signal to the magnitude of the reflected power to gather impedance data associated with antenna 42. For example, relatively high levels of reflected power relative to the transmitted power may indicate that there is an impedance discontinuity associated with antenna 42 whereas relatively low levels of reflected power may indicate that there is no impedance discontinuity associated with antenna 42. The presence or absence of an impedance discontinuity may identify how well matched antenna 42 is to a corresponding receive antenna 32 on device 10 for wireless charging.

As an example, when no objects are located over transmit antenna 42 (or when objects other than antenna 32 such as a metal device housing case are located over transmit antenna 42), there may be a large impedance discontinuity associated with transmit antenna 42. This impedance discontinuity may cause a relatively large amount (e.g., a maximum amount) of the signals transmitted to antenna 42 to be reflected back towards measurement circuitry 174 via coupler 170. Power measurement circuitry 174 may thereby measure a relatively large amount (e.g., a maximum amount) of reflected power in this scenario. For example, measurement circuitry 174 may compare the magnitude of the reflected power to the magnitude of the transmit power to identify that there is a relatively large (e.g., a maximum amount) of reflected power. The corresponding impedance data gathered by the impedance measurement circuitry may identify (e.g., based on the magnitude of the reflected power relative to the magnitude of the transmit power as measured at circuitry 174) that there is a relatively large impedance discontinuity at antenna 42, and that antenna 42 is not efficiently coupled to a corresponding receive antenna 32 for wireless charging. If desired, measurement circuitry 174 may transmit the measured power levels to control circuitry 18 and control circuitry 18 may compare the power levels to detect the impedance discontinuities.

As receive antenna 32 on device 10 is moved over transmit antenna 42, the impedance discontinuity between transmit antenna 42 and its surroundings (e.g., the space above antenna 42) will reduce. This reduction in the impedance discontinuity associated with antenna 42 will reduce the amount of power reflected back towards power measurement circuitry 174 via coupler 170. When receive antenna 32 is aligned with transmit antenna 42 (e.g., when the efficiency of wireless power transmission from antenna 42 to antenna 32 is at a maximum), the amount of power reflected back towards power measurement circuitry 174 via coupler 170 is at a minimum. Power measurement circuitry 174 may thereby measure a relatively small amount (e.g., a minimum amount) of reflected power in this scenario. For example, measurement circuitry 174 may compare the magnitude of the reflected power to the magnitude of the transmitted power to identify that there is a relatively small (e.g., a minimum amount) of reflected power. The corresponding impedance data gathered by the impedance measurement circuitry may identify (e.g., based on the magnitude of the reflected power relative to the magnitude of the transmit power) that there is a relatively small or no impedance discontinuity at antenna 42, and that antenna 42 is efficiently coupled to a corresponding receive antenna 32 for wireless charging.

This example in which the impedance measurement circuitry includes power measurement circuitry for detecting reflected power is merely illustrative. If desired, the impedance measurement circuitry may include phase and magnitude detection circuitry for identifying complex impedance values associated with antenna 42, or any other circuitry for gathering impedance data that identifies how well matched antenna 42 is with a corresponding receive antenna 32 (e.g., that identifies impedance discontinuities associated with antenna 42). If desired, the impedance measurement circuitry may gather the impedance data based on scattering parameter values (sometimes referred to as S-parameters or S-values). As an example, the circuitry may gather $S_{11}$ parameter values. The $S_{11}$ parameter values may be indicative of the amount of reflected power received by coupler 170 and may be calculated based on measured power levels of the reflected signal, for example. The $S_{11}$ values may also be calculated using complex impedance values in scenarios where the impedance measurement circuitry gathers complex impedance data. In general, lower magnitudes of measured $S_{11}$ values may be indicative of lower levels of impedance discontinuity at antenna 42 (e.g., higher levels of impedance matching) whereas higher magnitudes of measured $S_{11}$ values may be indicative of higher levels of impedance discontinuity at antenna 42 (e.g., lower levels of impedance matching).

The circuitry of FIG. 16 may be used to monitor, one, two, more than two, or all of the antennas 42 in device 12. The impedance data (e.g., the information identifying impedance discontinuities or impedance matching between antennas 42 and 43) gathered by the impedance measurement circuitry may be gathered in real time. For example, real time power level measurements and/or measured complex impedance values gathered by the impedance measurement circuitry may be processed by control circuitry 18 to determine which antennas 42 to select for transmission. Control circuitry 18 may, for example, identify reflected power levels or $S_{11}$ values for each of the antennas 42 and may identify an antenna having the minimum measured reflected power level or minimum $S_{11}$ value as the selected antenna for wireless power transmission. In another example, control circuitry 18 may identify any antennas having a measured $S_{11}$ value or a measured reflected power level that is less than or equal to a threshold value as the selected antennas. Control circuitry 18 may provide control signals to wireless power circuitry 40 and/or to switching circuitry interposed on transmit path 100 to transmit wireless charging signals 90 over the selected antennas.

The impedance measurement circuitry (e.g., circuitry 174, 170, and portions of control circuitry 18) may continue to gather impedance data for each antenna 42 in real time (e.g., as device 10 is wirelessly charged using the selected antennas). In this way, control circuitry 18 may update or actively change which antennas 42 are used for wireless power transmission as the gathered impedance data changes over time (e.g., while processing step 126 of FIG. 9). For example, control circuitry 18 may identify, based on the gathered reflected power level, that device 10 has been removed from surface 70. Control circuitry 18 may subsequently end wireless power transmission using antennas 42. In another example, control circuitry 18 may identify, based on gathered $S_{11}$ values, that device 10 has changed locations on surface 70 (e.g., when device 10 has moved from a first location 74 to a second location 78). Control circuitry 18 may subsequently change which antennas 42 are used for transmitting wireless charging signals 90.

This example shown in FIG. 16 is merely illustrative. If desired, wireless signals other than wireless charging signals 90 may be used to gather the antenna impedance information. For example, wireless probe signals at any desired frequency may be transmitted and measured by measurement circuitry 174 for determining the antenna impedance information. The probe signals may, for example, include short pulse waves and may, if desired, be transmitted at power levels less than that used by wireless charging signals 90 for charging the battery on device 10. Charging signals 90 that are used to charge the device using the selected antenna(s) may, for example, be at a maximum power level of device 12 or at any power level greater than the probe signals. Use of wireless probe signals to characterize the impedance of antennas 42 may, for example, allow for device 12 to conserve power while searching for a receive antenna 32 within wireless charging range of antennas 42. Once device 12 has detected that an antenna 32 is in wireless charging range using the wireless probe signals, one or more antennas 42 that are best matched with that antenna 32 may be used to transmit wireless charging signals at a greater power level than the probe signals. Those transmitted wireless charging signals may be used to determine whether the transmitting antenna needs to be changed and/or additional wireless probe signals may be transmitted to determine whether the transmitting antenna needs to be changed. If desired, other sensor circuitry on charging device 12 may detect which antennas 42 are in wireless charging range of receiver antenna 32. If desired, antennas 42 at different locations across surface 70 may concurrently transmit signals for charging multiple devices at once (e.g., in scenarios where multiple devices 10 are placed on surface 70 for charging).

Figure 17:
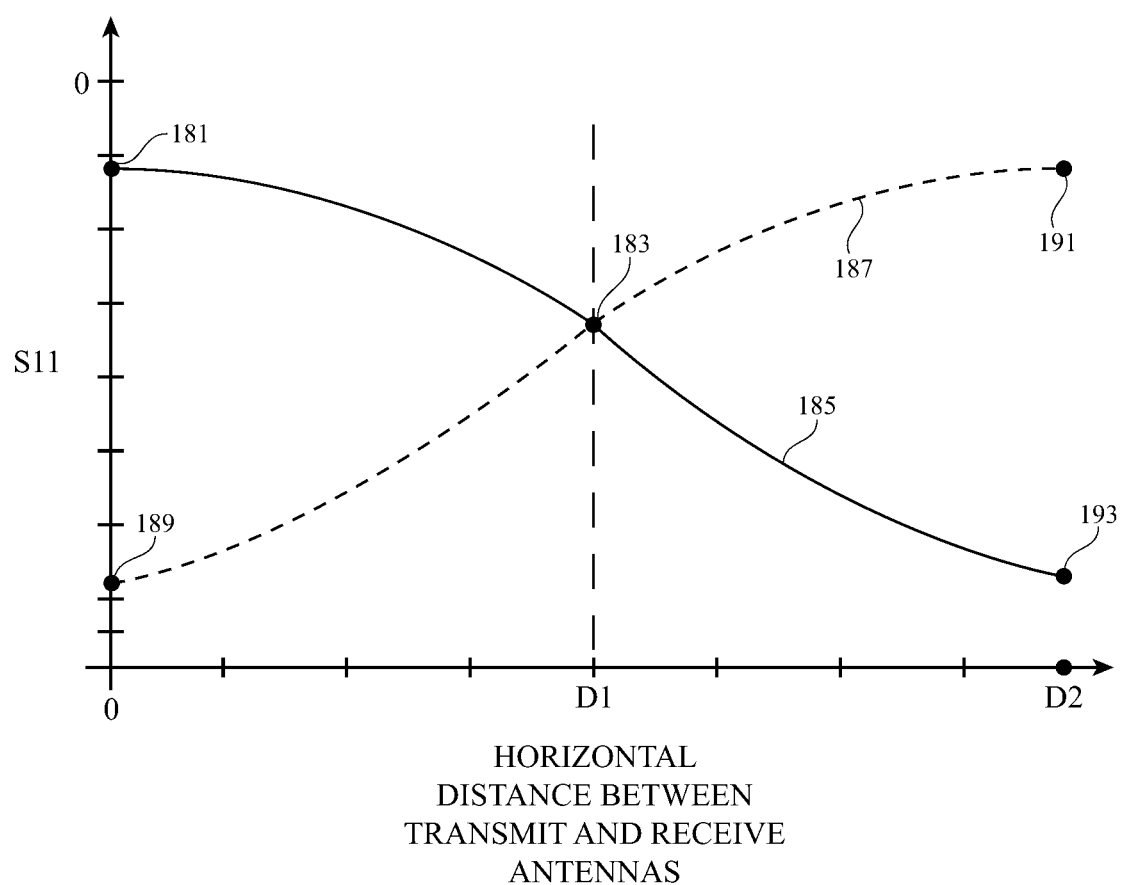
FIG. 17 is a plot showing an example of how scattering parameter values may be used to identify a selected antenna for wireless power transmission in accordance with an embodiment.

FIG. 17 is a plot showing how measured scattering parameter values $S_{11}$ may be used to identify a selected antenna 42 for wireless power transmission. The $S_{11}$ values may be gathered using $S_{11}$ detection circuitry on charging device 12 or may be computed based on the amount of reflected power received by power measurement circuitry 174 (e.g., scattering parameter $S_{11}$ may be directly proportional to the magnitude of the reflected power). In scenarios where the impedance measurement circuitry includes circuitry that measured complex impedance values, scattering parameter $S_{11}$ may be computed based on the measured complex impedance values using known relations. FIG. 17 plots measured $S_{11}$ values for two different antennas 42 as a function of horizontal distance between each antenna and a given receive antenna 32 (e.g., when device 10 having receive antenna 32 is placed on top of charging device 12). Curve 185 plots measured $S_{11}$ values for a first antenna 42 whereas curve 187 plots measured $S_{11}$ values for a second antenna 42.

When receive antenna 32 is aligned with the second antenna (e.g., when there is zero horizontal distance between the second antenna 42 and receive antenna 32) as shown at point 189, a minimum $S_{11}$ value may be measured from the second antenna (e.g., because there may be a minimum amount of reflected power due to the minimal impedance discontinuity between receive antenna 32 and the second antenna 42 at this location). This may indicate that the second antenna is well-matched with receive antenna 32. As receive antenna 32 is moved horizontally towards the first antenna (e.g., as device 10 is laterally moved across the surface of device 12), the magnitude of $S_{11}$ measured for the second antenna may increase. When receive antenna 32 is located at a horizontal distance of D2 with respect to the second antenna, a maximum $S_{11}$ value may be measured for the second antenna, as shown at point 191. However, when receive antenna 32 is located at distance D2 from the second antenna, receive antenna 32 may be well-aligned with respect to the first antenna (e.g., in scenarios where the first antenna 42 is located at a distance D2 from the second antenna 42). A minimum $S_{11}$ value may thereby be measured for the first antenna when receive antenna 32 is at this position, as shown by point 193.

As receive antenna 32 is moved laterally back towards the second antenna, the value of $S_{11}$ measured for the first antenna may increase. When receive antenna 32 is located at horizontal distance D2 with respect to the first antenna (e.g., at a distance of zero with respect to the second antenna), a maximum $S_{11}$ value may be gathered for the first antenna as shown by point 181. Conversely, receive antenna 32 may be well-aligned with respect to the second antenna at this point. At point 183 located between the first and second antennas (e.g., at a distance D1 from the second antenna or distance D2-D1 from the first antenna), $S_{11}$ values gathered for both the first and second antennas are equal. When antenna 32 is located to the left of point 183 (e.g., when antenna 32 is closer to the second antenna associated with curve 187), control circuitry 18 may select the second antenna for wireless charging (e.g., because the second antenna associated with curve 187 measures a smaller $S_{11}$ value than the first antenna associated with curve 185 for antenna positions to the left of D1). When antenna 32 is located to the right of point 183 (e.g., when receive antenna 32 is closer to the first antenna associated with curve 185), control circuitry 18 may select the first antenna for wireless charging (e.g., because the first antenna associated with curve 185 measures a smaller $S_{11}$ value than the second antenna associated with curve 187 for antenna positions to the right of D1). When receive antenna 32 is located at point 183, either or both antennas 42 may be selected for wireless charging. The example of FIG. 17 is merely illustrative. If desired, control circuitry 18 may select any antennas 42 that measure a value of $S_{11}$ that is below a threshold value to perform wireless charging.

Figure 18:
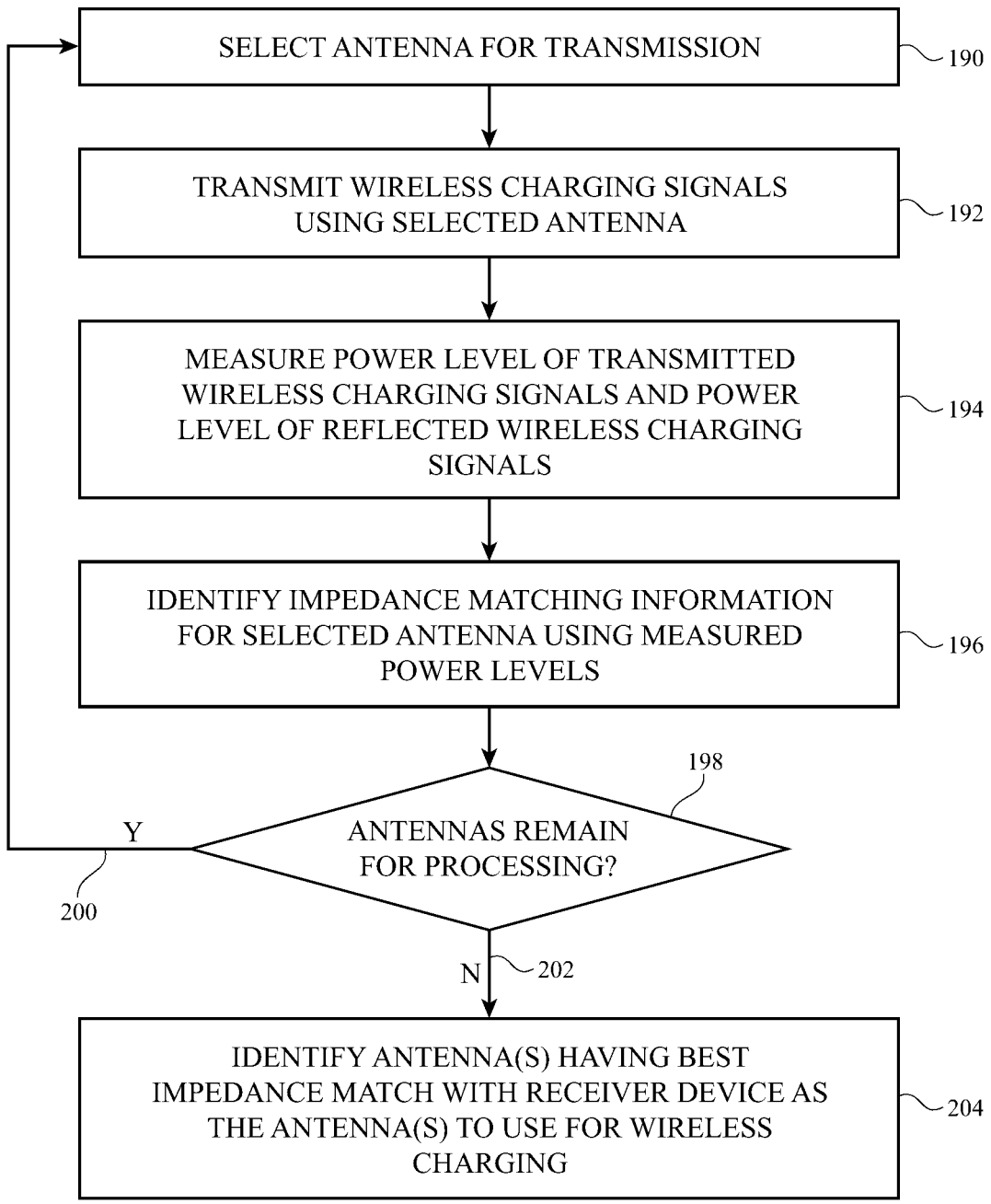
FIG. 18 is a flow chart of illustrative steps that may be performed by wireless charging equipment to select antennas for transmitting wireless charging signals in accordance with an embodiment.

FIG. 18 is a flow chart of illustrative steps that may be performed by wireless charging device 12 to select one or more antennas 42 for wireless power transmission. The steps of FIG. 18 may, for example, be performed while processing step 120 of FIG. 9.

At step 190, control circuitry 18 on charging device 12 may select a first antenna 42 for transmission. For example, control circuitry 18 may switch the selected antenna into use and/or activate transceiver circuitry coupled to the selected antenna.

At step 192, charging device 12 may transmit wireless charging signals 90 using the selected antenna. A portion of the transmitted signals may be received at power measurement circuitry 174 via path 172 and coupler 170 (FIG. 16). Power measurement circuitry 174 may receive reflected versions of the transmitted signals over the selected antenna, coupler 170, and path 172. This example is merely illustrative. If desired, device 12 may transmit radio-frequency signals other than charging signals 90 (e.g., wireless signals at any desired frequency). For example, device 12 may transmit wireless probe signals or other signals formatted for characterizing the impedance of antenna 42 (e.g., signals such as short pulse waves at power levels lower than those used to charge device 10).

At step 194, power measurement circuitry 174 may measure the power level of the transmitted signals received through coupler 170. Power measurement circuitry 174 may measure the power level of the reflected signals received through coupler 170. If desired, circuitry 174 or other circuitry may generate $S_{11}$ values based on the reflected signals. In another suitable arrangement, complex impedance measurement circuitry may measure complex impedance values for antenna 42.

At step 196, power measurement circuitry 174 and/or control circuitry 18 may identify impedance matching information (sometimes referred to herein as impedance data) associated with the selected antenna based on the measured power levels (e.g., the power levels measured while processing step 194). For example, measurement circuitry 174 may compare the measured power level of the transmitted signal to the measured power level of the reflected signal to identify the impedance matching information (e.g., impedance discontinuities) associated with the selected antenna 42. The identified impedance matching information may be indicative of how well aligned the selected antenna is to a corresponding receiver antenna 32C on device 10.

At step 198, control circuitry 18 may determine whether additional antennas 42 remain on charging device 12 for processing. If antennas remain, processing may loop back to step 190 as shown by path 200 to identify impedance information associated with additional antennas 42. If no antennas remain, processing may proceed to step 204 as shown by path 202. In this way, charging device 12 may cycle through each antenna 42 in the array for identifying the corresponding impedance information. This example is merely illustrative. If desired, charging device 12 may perform power measurements and identify impedance matching information for two or more (e.g., all) of antennas 42 in parallel.

At step 204, processing circuitry 18 may identify one or more antennas 42 as the selected antennas for charging device 10 based on the identified impedance matching information. For example, processing circuitry 18 may identify the one or more antennas 42 that are best impedance matched with receiver antenna 32A on device 10 (e.g., one or more antennas having a minimum measured $S_{11}$ value or antennas having a measured $S_{11}$ values that are less than or equal to a threshold value, one or more antennas having a minimum reflected power level or having a reflected power level that is less than a threshold value, etc.). In some scenarios, processing circuitry 18 may identify a single best impedance matched antenna 42 for wireless charging. If desired, processing circuitry 18 may select one or more antennas 42 adjacent to that antenna for concurrently charging device 10 (e.g., such as in the examples of FIGS. 12 and 14). The antennas 42 that are adjacent to the selected antenna(s) may, if desired, serve as a block filter or guard ring for the selected antennas (e.g., as shown in FIGS. 10 and 14). The selected antennas 42 may be fed using a single port or using two ports for concurrently transmitting wireless charging signals 90 at different polarizations (e.g., as shown in FIG. 8).

Figure 19:
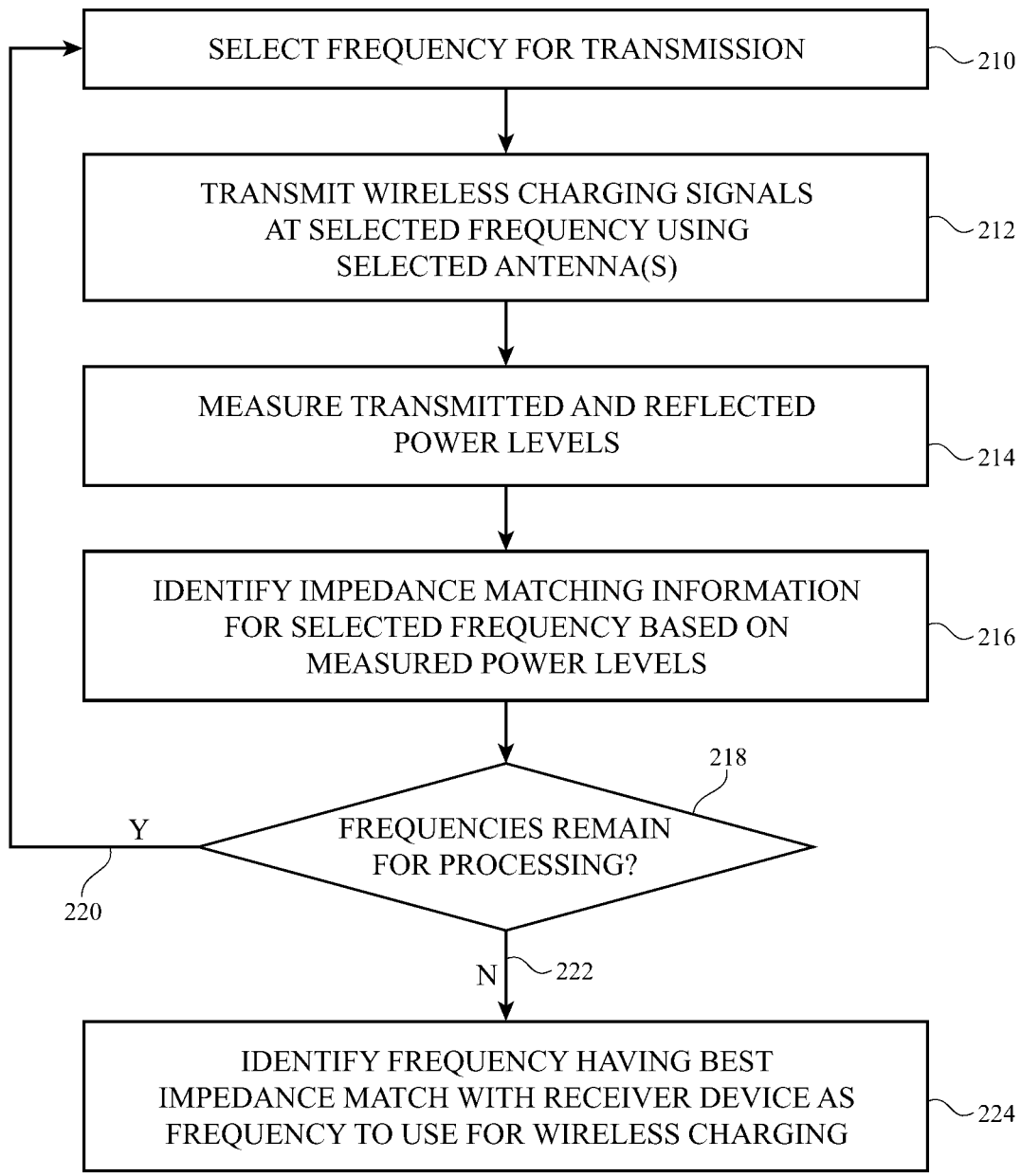
FIG. 19 is a flow chart of illustrative steps that may be performed by wireless charging equipment to select a frequency for transmitting wireless charging signals in accordance with an embodiment.

In practice, the impedance discontinuity associated with antenna 42 may be a function of the transmit frequency. FIG. 19 is a flow chart of illustrative steps that may be performed by charging device 12 to select a desired frequency for wireless charging signals 90. The steps of FIG. 19 may, for example, be performed while processing step 122 of FIG. 9.

At step 210, processing circuitry 18 may select a first frequency for transmission.

At step 212, charging device 12 may transmit wireless charging signals over the selected antenna(s) (e.g., as selected while processing the step 120 of FIG. 9) and at the selected frequency. If desired, device 12 may transmit radio-frequency signals other than charging signals 90 (e.g., wireless signals at any desired frequency). For example, device 12 may transmit wireless probe signals or other signals formatted for characterizing the impedance of antenna 42.

At step 214, power measurement circuitry 174 (FIG. 16) may measure power levels of the transmitted signals and reflected versions of the transmitted signals at the selected frequency. In another suitable arrangement, circuitry 174 may measure $S_{11}$ values based on the reflected power. In yet another suitable arrangement, complex impedance measurement circuitry may measure complex impedance values for antenna 42 at the selected frequency.

At step 216, power measurement circuitry 174 and/or control circuitry 18 may identify impedance matching information for the selected frequency based on the measured power levels (e.g., circuitry 174 and/or 18 may compare the reflected and transmit power levels to identify how well matched the selected antenna is to the receive antenna). At step 218, control and processing circuitry 18 may identify whether additional frequencies remain for processing. If additional frequencies remain, processing may loop back to step 210 as shown by path 220 to gather impedance matching information for the selected antennas at different frequencies. If no additional frequencies remain, processing may proceed to step 224 as shown by path 222.

At step 224, processing circuitry 18 may identify one or more frequencies for charging device 10 based on the identified impedance matching information. For example, processing circuitry 18 may identify the frequency that generated a best impedance match over the selected antennas for charging device 10 (e.g., one or more frequencies that generated a minimum amount of reflected power for the selected antennas, that generated a minimum $S_{11}$ value for the selected antennas, etc.). The selected antenna(s) may subsequently transmit wireless charging signals 90 at the selected frequency to charge device 10 (e.g., while processing step 124 of FIG. 9).

The example of FIG. 19 is merely illustrative. In one suitable arrangement, charging device 12 may change the selected frequency in coarse increments upon looping back over path 220. The coarse increments may be, for example, 50-100 MHz increments. After adjusting through coarse frequency increments, processing circuitry 18 may identify a coarse frequency having a best impedance match over the selected antenna(s). Once an optimal coarse frequency has been identified, charging device 12 may loop through fine frequency increments (e.g., 0.1 MHz, 1 MHz, 5 MHz, 10 MHz, or other increments that are finer than the coarse frequency increments) around the identified optimal coarse frequency. As an example, device 12 may loop through coarse frequencies in 50 MHz increments. Device 12 may identify an optimal coarse frequency of 150 MHz. Device 12 may subsequently loop through frequencies from 100 MHz to 200 MHz in 10 MHz increments. Once an optimal fine frequency has been found (e.g., a frequency having a best impedance match with the selected antenna), that frequency may be used for wireless charging.

By selecting best impedance matched antennas 42 and best impedance matched frequencies for wireless charging, charging device 12 may ensure that the efficiency with which device 10 is wirelessly charged is maximized, regardless of whether device 10 is moved to another location on the surface of charging device 12. These selection operations may also minimize signal leakage by preventing the transmission of wireless power using antennas that are not in the vicinity of device 10. Minimizing signal leakage may, for example, enhance the capability of device 12 to comply with regulatory limits or standards on emitted radiofrequency signals. Charging device 12 may further increase the efficiency with which device 10 is charged while minimizing signal leakage by forming a blocking filter from antennas 42 that are located around the selected antennas, and/or by concurrently transmitting wireless charging signals using multiple adjacent antennas 42. The examples described above in connection with wireless charging signals 90 are merely illustrative. If desired, antennas 42 may transmit any desired radio-frequency signals (e.g., for conveying data with device 10). The processes of FIGS. 9, 16, and 17 may, if desired, be performed for selecting optimal antennas and frequencies with which to convey the radio-frequency data with device 10.

The operations of devices 12 and 10 (e.g., the operations of FIGS. 9, 18, and 19) may be performed by control circuitry 16 and/or 18. During operation, this control circuitry (which may sometimes be referred to as processing circuitry, processing and storage, computing equipment, a computer, etc.) may be configured to perform the methods of FIGS. 9, 18, and 19 and/or other operations (e.g., using dedicated hardware and/or using software code running on hardware such as control circuitry 16 and/or 18). Software code for performing these operations may be stored on non-transitory (tangible) computer readable storage media. The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, other computer readable media, or combinations of these computer readable media. Software stored on the non-transitory computer readable storage media may be executed on the processing circuitry of control circuitry 16 and/or 18. The processing circuitry may include application-specific integrated circuits with processing circuitry, one or more microprocessors, or other processing circuitry.

The foregoing is merely illustrative and various modifications can be made by those skilled in the art without departing from the scope and spirit of the described embodiments. The foregoing embodiments may be implemented individually or in any combination.

What is claimed is:

1. A wireless charging mat for transmitting wireless power to an electronic device while the electronic device is placed on the wireless charging mat, the wireless charging mat comprising:
    a plurality of antennas that includes a selected transmit antenna configured to transmit wireless charging signals to the electronic device and that includes a set of antennas that surrounds the selected transmit antenna;
    wireless charging circuitry operatively coupled to the plurality of antennas; and
    control circuitry coupled to the wireless charging circuitry, wherein the control circuitry is configured to control the wireless charging circuitry to transmit the wireless charging signals over the selected transmit antenna and wherein the control circuitry is configured to control the set of antennas to form a guard ring structure for the selected transmit antenna.

2. The wireless charging mat defined in claim 1, wherein the control circuitry is configured to disable the set of antennas to prevent the set of antennas from transmitting any wireless charging signals while the selected transmit antenna transmits the wireless charging signals.

3. The wireless charging mat defined in claim 2, wherein a given antenna in the set of antennas comprises first and second antenna feed terminals, the wireless charging mat further comprising:
    a transmission line having a positive signal line coupled between the wireless charging circuitry and the first antenna feed terminal and a ground signal line coupled between the wireless charging circuitry and the second antenna feed terminal; and
    a switch interposed on the ground signal line, wherein the control circuitry is configured to control the given antenna to form a portion of the guard ring structure by closing the switch.

4. The wireless charging mat defined in claim 3, further comprising:
    an additional switch interposed on the positive signal line, wherein the control circuitry is configured to control the given antenna to transmit additional wireless charging signals by opening the switch and closing the additional switch.

5. The wireless charging mat defined in claim 1, wherein the set of antennas is configured to reflect at least some of the wireless charging signals transmitted by the selected transmit antenna back towards the selected transmit antenna.

6. The wireless charging mat defined in claim 1, wherein the set of antennas surrounds at least four sides of the selected transmit antenna.

7. The wireless charging mat defined in claim 6, wherein the plurality of antennas are formed in an array having consecutive first, second, and third rows, the selected transmit antenna is formed in the second row, and the guard ring structure includes antennas in the first, second, and third rows.

8. The wireless charging mat defined in claim 1, wherein the plurality of antennas comprises an additional selected transmit antenna that is configured to transmit the wireless charging signals, the additional selected transmit antenna is near field coupled to the selected transmit antenna, the control circuitry is configured to control the wireless charging circuitry to transmit the wireless charging signals over the additional selected transmit antenna, and the set of antennas surrounds both the selected transmit antenna and the additional selected transmit antenna.

9. The wireless charging mat defined in claim 1, wherein the selected transmit antenna and each antenna in the set of antennas comprise a respective patch antenna resonating element located in a common plane.

10. The wireless charging mat defined in claim 1, further comprising:
    a housing, wherein the plurality of antennas is formed within a cavity in the housing; and
    a cover layer positioned over the cavity and the plurality of antennas, wherein each antenna in the plurality of antennas comprises a respective antenna resonating element that is formed at a first distance with respect to a rear wall of the cavity and at a second distance with respect to the cover layer, the first distance being different from the second distance.

11. The wireless charging mat defined in claim 1, wherein the selected transmit antenna comprises a patch antenna, the wireless charging mat further comprising:
    a first transmission line coupled to the patch antenna at a first signal feed terminal; and
    a second transmission line coupled to the patch antenna at a second signal feed terminal that is different from the first signal feed terminal, wherein the wireless charging circuitry is configured to transmit the wireless charging signals over the patch antenna via the first and second signal feed terminals, and the wireless charging signals transmitted by the patch antenna exhibit first and second different radio-frequency polarizations.

12. An electronic device configured to wirelessly transfer power to an external device, the electronic device comprising:
    a housing;
    wireless power transfer circuitry in the housing;
    a cavity formed in the housing;
    a cover layer positioned over the cavity;
    a plurality of antennas within the cavity, wherein at least one antenna in the plurality of antennas is configured to transmit wireless charging signals at a transmit frequency from the wireless power transfer circuitry to the external device through the cover layer while the external device is on the cover layer, the transmit frequency being greater than 1 GHz, wherein the plurality of antennas in the cavity comprises an array of patch antennas; and control circuitry coupled to the wireless power transfer circuitry, wherein the control circuitry is configured to:
select a patch antenna in the array to transmit the wireless charging signals to the external device, and
disable a ring of patch antennas around the selected patch antenna in the array to form a guard ring structure for the selected patch antenna, wherein the guard ring structure is configured to block at least some of the wireless charging signals at the transmit frequency.

13. The electronic device defined in claim 12, further comprising:
a dielectric support structure formed on a rear surface of the cavity that opposes the cover layer, wherein each of the patch antennas in the array comprises a respective patch antenna resonating element formed on a surface of the dielectric support structure, the surface of the dielectric support structure is located at a first distance that is between 0.5 and 10 mm from the rear surface of the cavity, and the surface of the dielectric support structure is located at a second distance that is between 2 and 20 mm from the cover layer.

14. The electronic device defined in claim 12, wherein the control circuitry is configured to gather impedance measurements using the plurality of antennas and to select the patch antenna in the array to transmit the wireless charging signals to the external device based on the gathered impedance measurements.

15. An electronic device configured to provide wireless power to an external device that is placed on the electronic device, the electronic device comprising:
wireless power transfer circuitry that is configured to generate wireless charging signals;
a plurality of antennas operatively coupled to the wireless power transfer circuitry; and
control circuitry coupled to the wireless power transfer circuitry, wherein the control circuitry is configured to control the wireless power transfer circuitry to transmit the wireless charging signals over a selected antenna of the plurality of antennas, wherein the control circuitry is configured to control a set of antennas in the plurality of antennas that is adjacent to the selected antenna to form a filter, and wherein the filter is configured to block at least some of the transmitted wireless charging signals from being transmitted past the set of antennas.

16. The electronic device defined in claim 15, wherein each antenna in the set of antennas is coupled to the wireless power transfer circuitry by a respective transmission line having a corresponding positive signal line and a corresponding ground signal line, wherein a respective switch is interposed on each of the ground signal lines, and wherein the control circuitry is configured to short the wireless charging signals transmitted by the selected antenna to ground at the location of each antenna in the set of antennas by closing each of the respective switches.

17. The electronic device defined in claim 16, wherein the wireless power transfer circuitry is configured to generate the wireless charging signals at a transmit frequency that is greater than 1 GHz.

18. The electronic device defined in claim 15, wherein the set of antennas that forms the filter comprises a ring of antennas that surrounds the selected antenna.

19. The electronic device defined in claim 15, wherein the control circuitry is configured to control the wireless power transfer circuitry to transmit the wireless charging signals over an additional selected antenna in the plurality of antennas, the additional selected antenna being near field coupled to the selected antenna, and the set of antennas that forms the filter comprising a ring of antennas that surrounds the selected antenna and the additional selected antenna.

* * * * *